United States Patent
Sasaki et al.

(10) Patent No.: US 8,366,948 B2
(45) Date of Patent: Feb. 5, 2013

(54) METHOD OF MANUFACTURING NEAR-FIELD LIGHT GENERATING ELEMENT AND METHOD OF MANUFACTURING HEAT-ASSISTED MAGNETIC RECORDING HEAD

(75) Inventors: Yoshitaka Sasaki, Milpitas, CA (US); Hiroyuki Ito, Milpitas, CA (US); Shigeki Tanemura, Milpitas, CA (US); Hironori Araki, Milpitas, CA (US)

(73) Assignee: Headway Technologies, Inc., Milpitas ( * ) Notice: Subject to any disclaimer, the term of this patent is extended or adjusted under 35 U.S.C. 154(b) by 431 days.

(21) Appl. No.: 12/714,998

(22) Filed: Mar. 1, 2010

(65) Prior Publication Data
US 2011/0210095 A1    Sep. 1, 2011

(51) Int. Cl.
*B44C 1/22* (2006.01)
*B29D 11/00* (2006.01)
(52) U.S. Cl. .................................. 216/22; 216/24
(58) Field of Classification Search .............. 216/22
See application file for complete search history.

(56) References Cited

U.S. PATENT DOCUMENTS

| | | | |
|---|---|---|---|
| 6,649,894 B2 | 11/2003 | Matsumoto et al. | |
| 7,911,883 B2 | 3/2011 | Sasaki et al. | |
| 8,000,175 B2 | 8/2011 | Shimazawa et al. | |
| 8,194,510 B2* | 6/2012 | Sasaki et al. | 369/13.33 |
| 2006/0233062 A1 | 10/2006 | Bedillion et al. | |
| 2007/0165494 A1 | 7/2007 | Cho et al. | |
| 2008/0002298 A1 | 1/2008 | Sluzewski | |
| 2008/0055762 A1 | 3/2008 | Shimazawa et al. | |
| 2010/0061200 A1 | 3/2010 | Shimazawa et al. | |
| 2010/0073802 A1 | 3/2010 | Komura et al. | |
| 2010/0118431 A1 | 5/2010 | Tomikawa et al. | |

(Continued)

FOREIGN PATENT DOCUMENTS

| JP | A-2003-114184 | 4/2003 |
|---|---|---|
| JP | A-2005-004901 | 1/2005 |

(Continued)

OTHER PUBLICATIONS

Oct. 5, 2011 Office Action issued in U.S. Appl. No. 12/727,620.

(Continued)

*Primary Examiner* — Shamim Ahmed
*Assistant Examiner* — Bradford Gates
(74) *Attorney, Agent, or Firm* — Oliff & Berridge, PLC

(57) ABSTRACT

A near-field light generating element has an outer surface including first and second inclined surfaces and an edge part that connects the first and second inclined surfaces to each other. In a method of manufacturing the near-field light generating element, a polishing stopper layer is initially formed on a metal layer, and the polishing stopper layer and the metal layer are etched so that the metal layer is provided with the first inclined surface. Next, a coating layer is formed to cover the metal layer and the polishing stopper layer. The coating layer is made of a non-metallic inorganic material that has an etching rate lower than that of the metal layer in a second etching step to be performed later. Next, the coating layer is polished until the polishing stopper layer is exposed. Next, the second etching step is performed to etch the polishing stopper layer and the metal layer using the coating layer as the etching mask. This provides the metal layer with the second inclined surface and the edge part, and thereby makes the metal layer into the near-field light generating element.

8 Claims, 14 Drawing Sheets

U.S. PATENT DOCUMENTS

| | | | |
|---|---|---|---|
| 2010/0142079 A1* | 6/2010 | Tanaka et al. | 216/22 |
| 2010/0172220 A1 | 7/2010 | Komura et al. | |
| 2010/0195238 A1 | 8/2010 | Shimazawa et al. | |
| 2010/0202081 A1 | 8/2010 | Shimazawa et al. | |
| 2010/0238580 A1 | 9/2010 | Shimazawa et al. | |
| 2010/0290323 A1 | 11/2010 | Isogai et al. | |
| 2010/0328806 A1 | 12/2010 | Sasaki et al. | |
| 2011/0013497 A1 | 1/2011 | Sasaki et al. | |
| 2011/0026377 A1 | 2/2011 | Shimazawa et al. | |
| 2011/0058273 A1 | 3/2011 | Sasaki et al. | |
| 2011/0096435 A1 | 4/2011 | Sasaki et al. | |
| 2011/0096639 A1 | 4/2011 | Matsumoto | |
| 2011/0228417 A1 | 9/2011 | Sasaki et al. | |

FOREIGN PATENT DOCUMENTS

| | | |
|---|---|---|
| JP | A-2007-257753 | 10/2007 |
| JP | A-2008-016096 | 1/2008 |

OTHER PUBLICATIONS

Yoshitaka Sasaki et al., U.S. Appl. No. 12/385,447, filed Apr. 8, 2009.
Yoshitaka Sasaki et al., U.S. Appl. No. 12/457,984, filed Jun. 26, 2009.
Yoshitaka Sasaki et al., U.S. Appl. No. 12/458,546, filed Jul. 15, 2009.
Yoshitaka Sasaki et al., U.S. Appl. No. 12/585,150, filed Sep. 4, 2009.
Yoshitaka Sasaki et al., U.S. Appl. No. 12/727,666, filed Mar. 19, 2010.
Yoshitaka Sasaki et al., U.S. Appl. No. 12/727,620, filed Mar. 19, 2010.
Challener W.A., et al. "Heat-Assisted Magnetic Recording by a Near-Field Transducer with Efficient Optical Energy Transfer," Nature Photonics, Mar. 2009, pp. 1-5, Seagate Technology, Pittsburgh, PA.
May 27, 2011 Office Action issued in U.S. Appl. No. 12/385,447.
Oct. 5, 2011 Office Action issued in U.S. Appl. No. 12/727,666.

* cited by examiner

METHOD OF MANUFACTURING NEAR-FIELD LIGHT GENERATING ELEMENT AND METHOD OF MANUFACTURING HEAT-ASSISTED MAGNETIC RECORDING HEAD

BACKGROUND OF THE INVENTION

1. Field of the Invention

The present invention relates to a method of manufacturing a near-field light generating element for use in heat-assisted magnetic recording where a recording medium is irradiated with near-field light to lower the coercivity of the recording medium for data writing, and a method of manufacturing a heat-assisted magnetic recording head that includes the near-field light generating element.

2. Description of the Related Art

Recently, magnetic recording devices such as magnetic disk drives have been improved in recording density, and thin-film magnetic heads and recording media of improved performance have been demanded accordingly. Among the thin-film magnetic heads, a composite thin-film magnetic head has been used widely. The composite thin-film magnetic head has such a structure that a read head including a magnetoresistive element (hereinafter, also referred to as MR element) for reading and a write head including an induction-type electromagnetic transducer for writing are stacked on a substrate. In a magnetic disk drive, the thin-film magnetic head is mounted on a slider that flies slightly above the surface of the magnetic recording medium.

To increase the recording density of a magnetic recording device, it is effective to make the magnetic fine particles of the recording medium smaller. Making the magnetic fine particles smaller, however, causes the problem that the magnetic fine particles drop in the thermal stability of magnetization. To solve this problem, it is effective to increase the anisotropic energy of the magnetic fine particles. However, increasing the anisotropic energy of the magnetic fine particles leads to an increase in coercivity of the recording medium, and this makes it difficult to perform data writing with existing magnetic heads.

To solve the foregoing problems, there has been proposed a technique so-called heat-assisted magnetic recording. This technique uses a recording medium having high coercivity. When writing data, a magnetic field and heat are simultaneously applied to the area of the recording medium where to write data, so that the area rises in temperature and drops in coercivity for data writing. The area where data is written subsequently falls in temperature and rises in coercivity to increase the thermal stability of magnetization. Hereinafter, a magnetic head for use in heat-assisted magnetic recording will be referred to as a heat-assisted magnetic recording head.

In heat-assisted magnetic recording, near-field light is typically used as a means for applying heat to the recording medium. A known method for generating near-field light is to apply laser light to a plasmon antenna, which is a small piece of metal, as described in U.S. Patent Application Publication No. 2008/0055762 A1, for example. The laser light applied to the plasmon antenna excites surface plasmons on the plasmon antenna, and near-field light is generated based on the surface plasmons. The near-field light generated by the plasmon antenna exists only within an area smaller than the diffraction limit of light. Irradiating the recording medium with the near-field light makes it possible to heat only a small area of the recording medium.

A possible configuration of the heat-assisted magnetic recording head is such that, in a medium facing surface that faces the recording medium, an end face of a magnetic pole that produces a write magnetic field is located on the trailing side relative to a front end face of a near-field light generating element which is a piece of metal that generates near-field light. The trailing side relative to a reference position refers to the side closer to the air outflow end of the slider relative to the reference position. The trailing side typically falls on the side farther from the top surface of the substrate relative to the reference position. When the above-described configuration is employed, the front end face of the near-field light generating element preferably has a pointed top end so that a near-field light generating part is formed near the top end of the front end face.

In order to increase the recording density of the magnetic recording device, it is preferred that the near-field light have a smaller spot diameter. When the foregoing configuration is employed, it is effective to form the top end of the front end face of the near-field light generating element into a more sharply pointed shape so as to produce near-field light having a small spot diameter and sufficient intensity.

As a method for forming the near-field light generating element having the front end face with a pointed top end, a metal film to make the near-field light generating element may be etched by using an etching mask of photoresist. The formation of the near-field light generating element by such a method, however, has the problem that the top end of the front end face will become rounded, and it is thus difficult to form a near-field light generating element having a front end face with a sharply pointed top end.

OBJECT AND SUMMARY OF THE INVENTION

It is an object of the present invention to provide a method of manufacturing a near-field light generating element that makes it possible to manufacture a near-field light generating element having a front end face with a sharply pointed top end, and a method of manufacturing a heat-assisted magnetic recording head including such a near-field light generating element.

A near-field light generating element to be manufactured by a manufacturing method of the present invention has a near-field light generating part. A surface plasmon is excited based on light. The surface plasmon is propagated to the near-field light generating part. The near-field light generating part generates near-field light based on the surface plasmon. The near-field light generating element has an outer surface. The outer surface includes: a bottom surface; first and second inclined surfaces that are each connected to the bottom surface, the first and second inclined surfaces decreasing in distance from each other with increasing distance from the bottom surface; an edge part that connects the first and second inclined surfaces to each other; and a front end face that connects the bottom surface and the first and second inclined surfaces to each other. The front end face has: a first side that lies at an end of the first inclined surface; a second side that lies at an end of the second inclined surface; a third side that lies at an end of the bottom surface; and a tip that is formed by contact of the first and second sides with each other and forms the near-field light generating part.

The method of manufacturing the near-field light generating element of the present invention includes: a step of forming a metal layer that is to be etched later to become the near-field light generating element; a step of forming a polishing stopper layer on the metal layer, the polishing stopper layer being intended for use in a polishing step to be performed later; a first etching step of etching the polishing stopper layer and the metal layer so that the metal layer is provided with the first inclined surface; a step of forming a coating layer to cover the polishing stopper layer and the metal layer provided with the first inclined surface, the coating layer being made of a non-metallic inorganic material that has an etching rate lower than that of the metal layer in a second etching step to be performed later; the polishing step of polishing the coating layer until the polishing stopper layer is exposed; and the second etching step of etching the polishing stopper layer and the metal layer by using the coating layer polished in the polishing step as an etching mask so that the metal layer is provided with the second inclined surface and the edge part and thereby becomes the near-field light generating element.

In the method of manufacturing the near-field light generating element of the present invention, the coating layer may be made of one selected from the group consisting of $Al_2O_3$, $SiO_2$, $Ta_2O_5$, SiC, and TiN.

A heat-assisted magnetic recording head to be manufactured by a manufacturing method of the present invention includes: a medium facing surface that faces a recording medium; a magnetic pole that has an end face located in the medium facing surface and produces a write magnetic field for writing data on the recording medium; a waveguide that propagates light; and a near-field light generating element. The near-field light generating element has a near-field light generating part located in the medium facing surface. A surface plasmon is excited based on the light propagated through the waveguide. The surface plasmon is propagated to the near-field light generating part. The near-field light generating part generates near-field light based on the surface plasmon.

In the heat-assisted magnetic recording head, the near-field light generating element has an outer surface. The outer surface includes: a bottom surface; first and second inclined surfaces that are each connected to the bottom surface, the first and second inclined surfaces decreasing in distance from each other with increasing distance from the bottom surface; an edge part that connects the first and second inclined surfaces to each other; and a front end face that is located in the medium facing surface and connects the bottom surface and the first and second inclined surfaces to each other. The front end face has: a first side that lies at an end of the first inclined surface; a second side that lies at an end of the second inclined surface; a third side that lies at an end of the bottom surface; and a tip that is formed by contact of the first and second sides with each other and forms the near-field light generating part.

The method of manufacturing the heat-assisted magnetic recording head of the present invention includes the steps of forming the near-field light generating element; forming the magnetic pole; and forming the waveguide.

The step of forming the near-field light generating element includes: a step of forming a metal layer that is to be etched later to become the near-field light generating element; a step of forming a polishing stopper layer on the metal layer, the polishing stopper layer being intended for use in a polishing step to be performed later; a first etching step of etching the polishing stopper layer and the metal layer so that the metal layer is provided with the first inclined surface; a step of forming a coating layer to cover the polishing stopper layer and the metal layer provided with the first inclined surface, the coating layer being made of a non-metallic inorganic material that has an etching rate lower than that of the metal layer in a second etching step to be performed later; the polishing step of polishing the coating layer until the polishing stopper layer is exposed; and the second etching step of etching the polishing stopper layer and the metal layer by using the coating layer polished in the polishing step as an etching mask so that the metal layer is provided with the second inclined surface and the edge part and thereby becomes the near-field light generating element.

In the method of manufacturing the heat-assisted magnetic recording head of the present invention, the coating layer may be made of one selected from the group consisting of $Al_2O_3$, $SiO_2$, $Ta_2O_5$, SiC, and TiN.

In the method of manufacturing the heat-assisted magnetic recording head of the present invention, the step of forming the near-field light generating element may further include, between the polishing step and the second etching step, a step of forming a second polishing stopper layer on the coating layer, the second polishing stopper layer being intended for use in a second polishing step to be performed later. In such a case, the method of manufacturing the heat-assisted magnetic recording head further includes: a step of forming a second coating layer after the second etching step, the second coating layer being formed to cover the near-field light generating element, the coating layer and the second polishing stopper layer; the second polishing step of polishing the second coating layer until the second polishing stopper layer is exposed; and a step of removing the second polishing stopper layer after the second polishing step.

In the method of manufacturing the heat-assisted magnetic recording head of the present invention, the step of forming the near-field light generating element may further include, before the step of forming the metal layer, a step of forming an accommodating layer that has an accommodating part in which the metal layer is to be accommodated later, the accommodating layer being made of a material that has an etching rate lower than that of the metal layer in the first and second etching steps to be performed later. In such a case, the metal layer is formed to be accommodated in the accommodating part in the step of forming the metal layer. The polishing stopper layer is formed over the accommodating layer and the metal layer in the step of forming the polishing stopper layer. The polishing stopper layer remains on the accommodating layer after the second etching step. Here, the method of manufacturing the heat-assisted magnetic recording head further includes: a step of forming a second coating layer after the second etching step, the second coating layer being formed to cover the accommodating layer, the polishing stopper layer, the near-field light generating element and the coating layer; a second polishing step of polishing the second coating layer until the polishing stopper layer is exposed; and a step of removing the polishing stopper layer after the second polishing step.

In the method of manufacturing the heat-assisted magnetic recording head of the present invention, the magnetic pole may have a bottom end that is opposed to the edge part of the near-field light generating element. The step of forming the magnetic pole may form the magnetic pole after the step of forming the near-field light generating element.

In the method of manufacturing the heat-assisted magnetic recording head of the present invention, the waveguide may have a bottom surface that is opposed to the edge part of the near-field light generating element. The step of forming the waveguide may form the waveguide after the step of forming the near-field light generating element.

In the method of manufacturing the near-field light generating element of the present invention or the method of manufacturing the heat-assisted magnetic recording head of the present invention, the polishing stopper layer and the metal layer are etched in the second etching step by using the coating layer polished in the polishing step as an etching mask. This provides the metal layer with the second inclined surface and the edge part, and thereby makes the metal layer into the near-field light generating element. The coating layer is made of a non-metallic inorganic material that has an etching rate lower than that of the metal layer in the second etching step. According to the present invention, it is therefore possible to prevent the edge part from being rounded in the second etching step, so that the edge part can be formed into a sharply pointed shape. Consequently, according to the present invention, it is possible to manufacture a near-field light generating element that has a front end face with a sharply pointed top end.

Other and further objects, features and advantages of the present invention will appear more fully from the following description.

DETAILED DESCRIPTION OF THE PREFERRED EMBODIMENTS

First Embodiment

Figure 1:
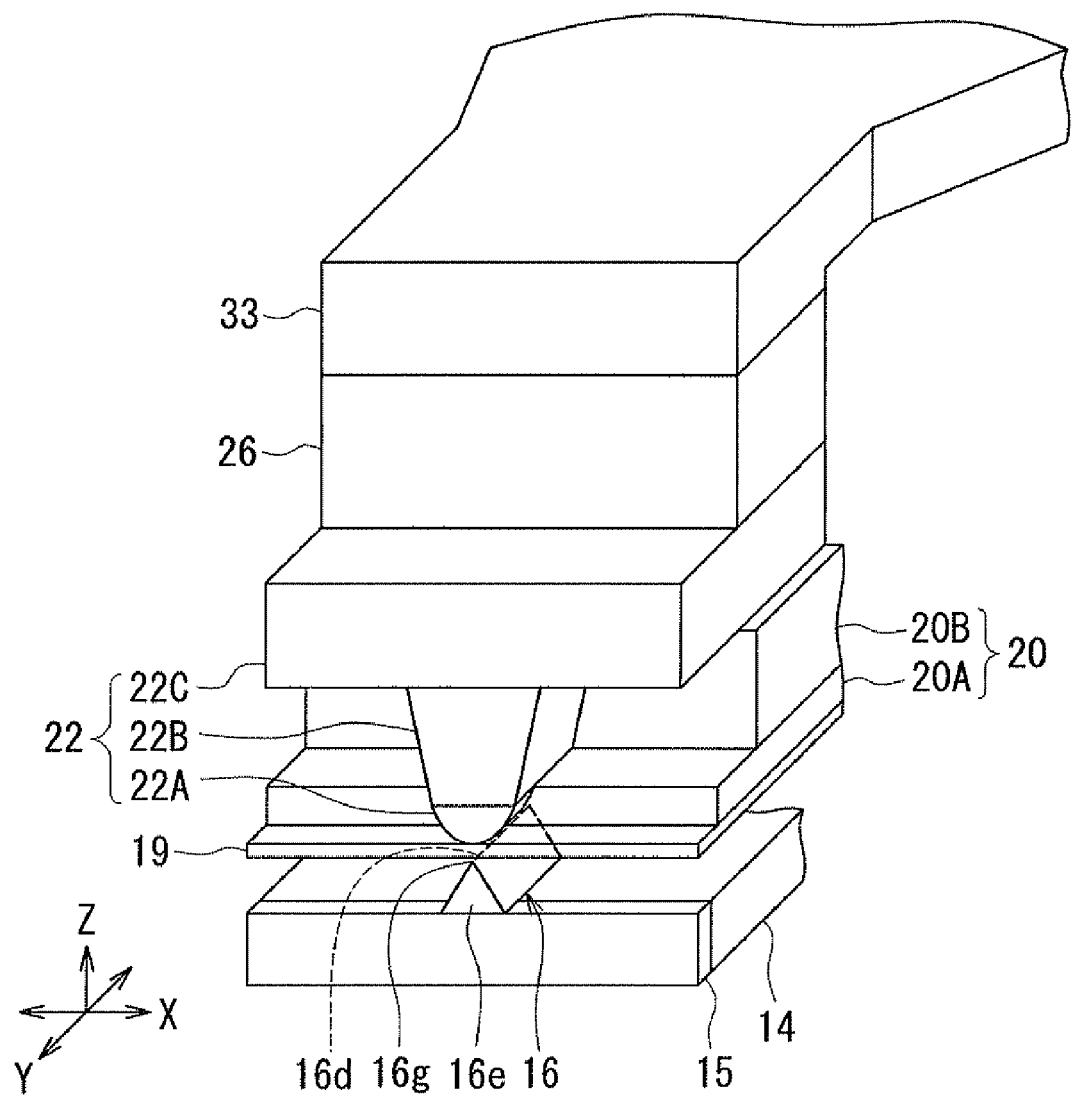
FIG. 1 is a perspective view showing the main part of a heat-assisted magnetic recording head according to a first embodiment of the invention.
Figure 2:
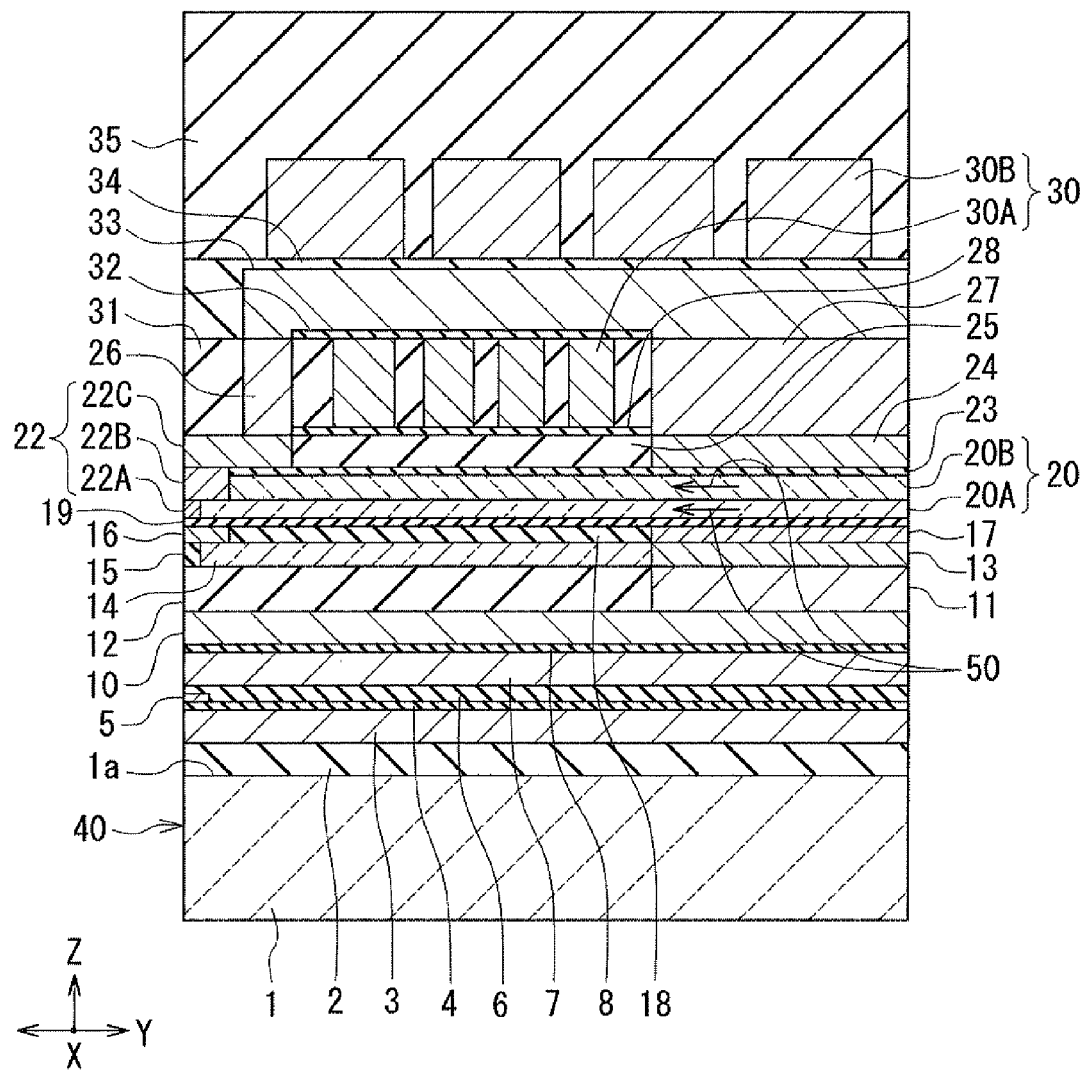
FIG. 2 is a cross-sectional view showing the configuration of the heat-assisted magnetic recording head according to the first embodiment of the invention.
Figure 3:
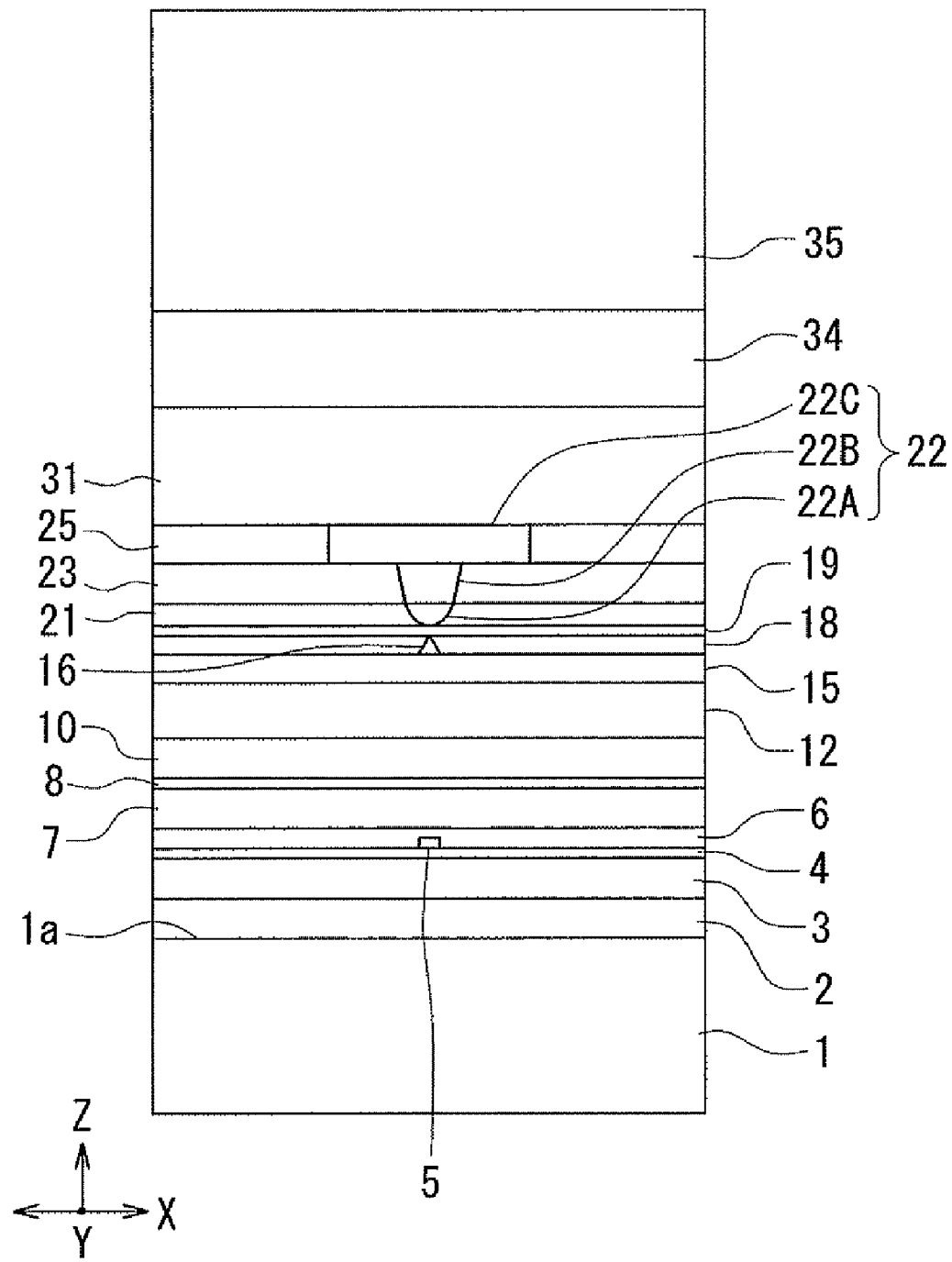
FIG. 3 is a front view showing the medium facing surface of the heat-assisted magnetic recording head according to the first embodiment of the invention.
Figure 4:
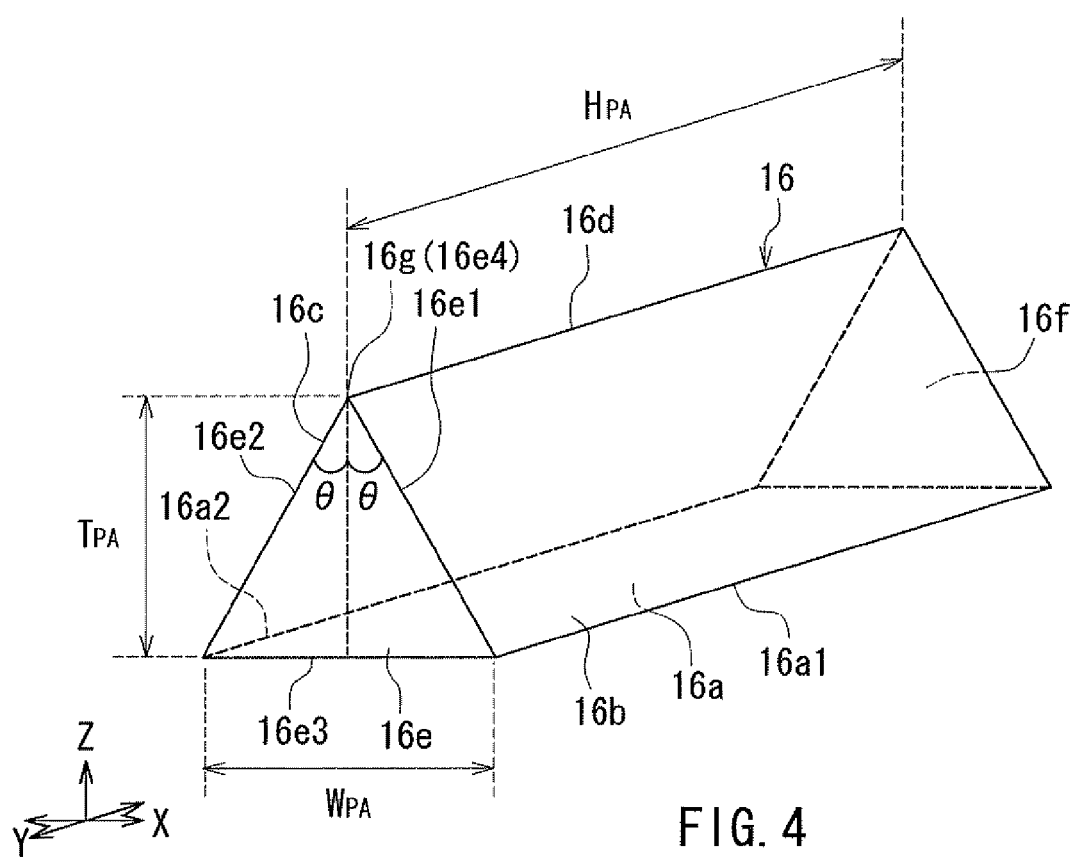
FIG. 4 is a perspective view showing a near-field light generating element according to the first embodiment of the invention.
Figure 5:
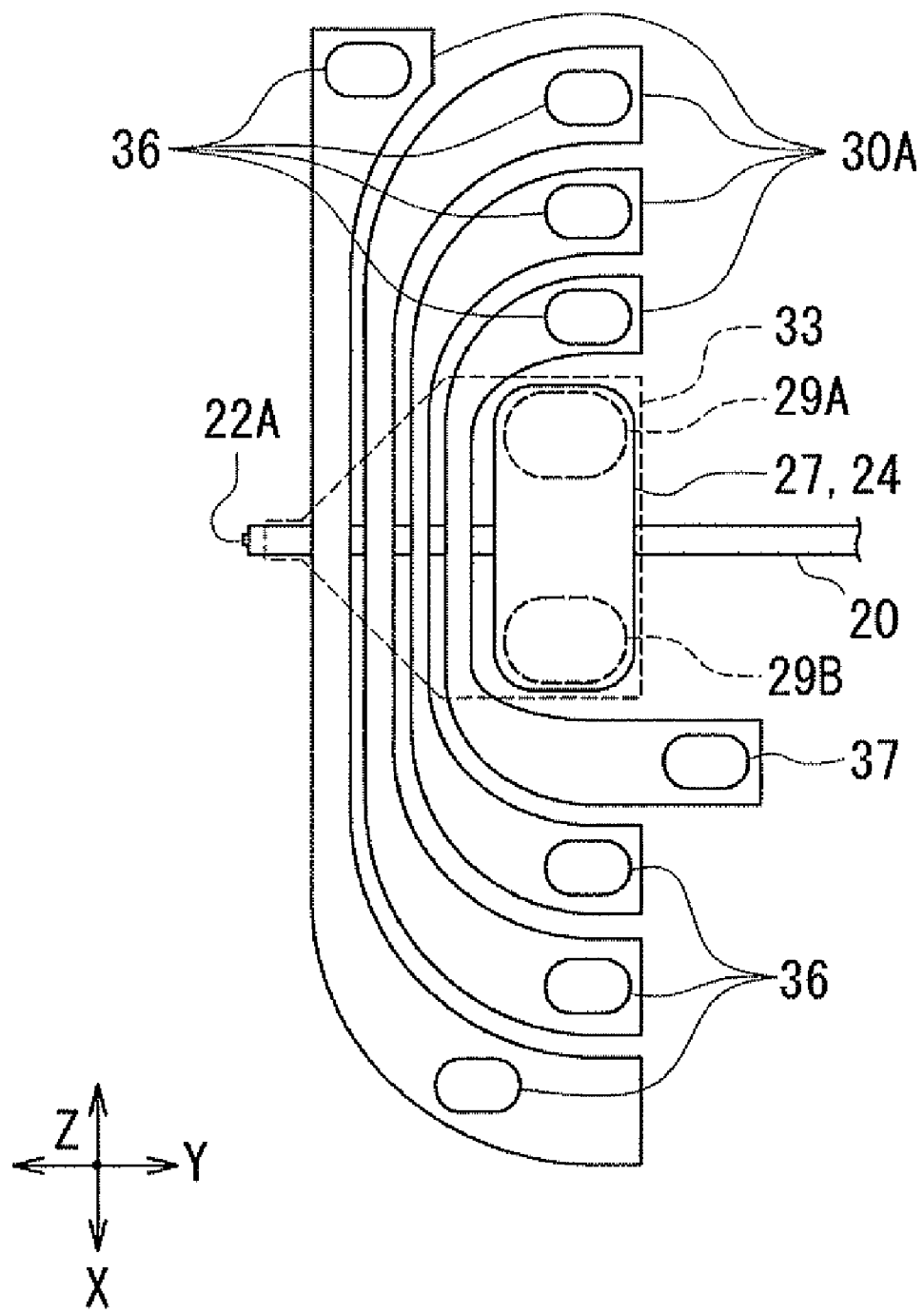
FIG. 5 is a plan view showing a first layer of a coil of the heat-assisted magnetic recording head according to the first embodiment of the invention.
Figure 6:
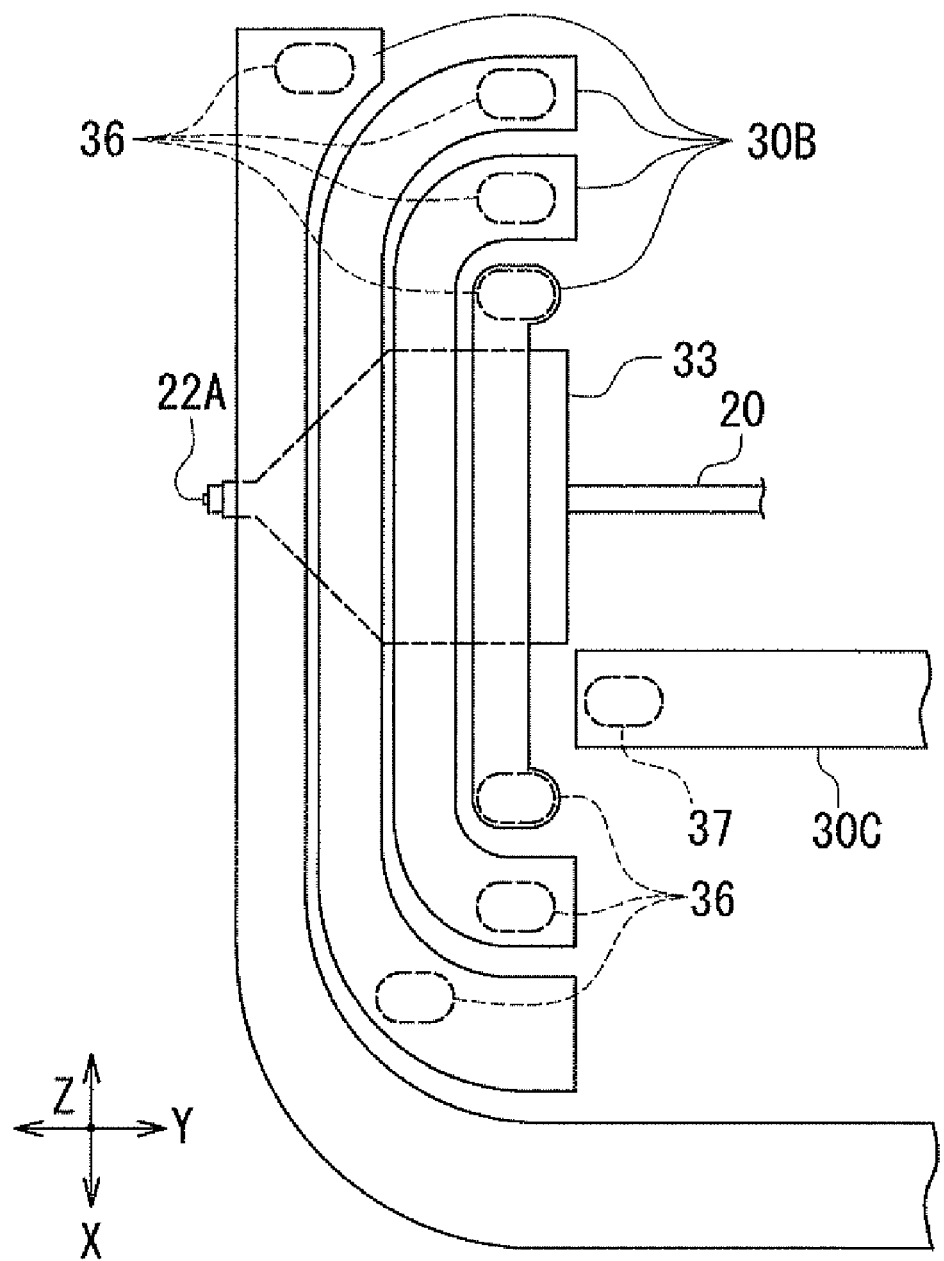
FIG. 6 is a plan view showing a second layer of the coil of the heat-assisted magnetic recording head according to the first embodiment of the invention.

Preferred embodiments of the present invention will now be described in detail with reference to the drawings. First, reference is made to FIG. 1 to FIG. 6 to describe the configuration of a heat-assisted magnetic recording head according to a first embodiment of the invention. FIG. 1 is a perspective view showing the main part of the heat-assisted magnetic recording head. FIG. 2 is a cross-sectional view showing the configuration of the heat-assisted magnetic recording head. FIG. 3 is a front view showing the medium facing surface of the heat-assisted magnetic recording head. FIG. 4 is a perspective view showing a near-field light generating element according to the present embodiment. FIG. 5 is a plan view showing a first layer of a coil of the heat-assisted magnetic recording head. FIG. 6 is a plan view showing a second layer of the coil of the heat-assisted magnetic recording head.

The heat-assisted magnetic recording head according to the present embodiment is for use in perpendicular magnetic recording, and is in the form of a slider that flies over the surface of a recording medium that is driven to rotate. When the recording medium rotates, an airflow passing between the recording medium and the slider causes a lift to be exerted on the slider. The slider is configured to fly over the surface of the recording medium by means of the lift.

As shown in FIG. 2, the heat-assisted magnetic recording head has a medium facing surface 40 that faces the recording medium. Here, X direction, Y direction, and Z direction will be defined as follows. The X direction is the direction across the tracks of the recording medium, i.e., the track width direction. The Y direction is a direction perpendicular to the medium facing surface 40. The Z direction is the direction of travel of the recording medium as viewed from the slider. The X, Y, and Z directions are orthogonal to one another.

As shown in FIG. 2 and FIG. 3, the heat-assisted magnetic recording head includes: a substrate 1 made of a ceramic material such as aluminum oxide-titanium carbide ($Al_2O_3$—TiC) and having a top surface 1a; an insulating layer 2 made of an insulating material and disposed on the top surface 1a of the substrate 1; and a bottom shield layer 3 made of a magnetic material and disposed on the insulating layer 2. The insulating layer 2 is made of alumina ($Al_2O_3$), for example.

The heat-assisted magnetic recording head further includes: a bottom shield gap film 4 which is an insulating film disposed on the top surface of the bottom shield layer 3;

a magnetoresistive (MR) element 5 as a read element disposed on the bottom shield gap film 4; two leads (not shown) connected to the MR element 5; a top shield gap film 6 which is an insulating film disposed on the MR element 5; and a top shield layer 7 made of a magnetic material and disposed on the top shield gap film 6.

An end of the MR element 5 is located in the medium facing surface 40 that faces the recording medium. The MR element 5 may be an element made of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current used for detecting magnetic signals is fed in a direction nearly parallel to the plane of layers constituting the GMR element or the current-perpendicular-to-plane (CPP) type in which the current used for detecting magnetic signals is fed in a direction nearly perpendicular to the plane of layers constituting the GMR element. If the MR element 5 is a TMR element or a CPP-type GMR element, the bottom shield layer 3 and the top shield layer 7 may also function as the two leads, with the top surface of the bottom shield layer 3 in contact with the bottom surface of the MR element 5 and the bottom surface of the top shield layer 7 in contact with the top surface of the MR element 5. The parts from the bottom shield layer 3 to the top shield layer 7 constitute a read head.

The heat-assisted magnetic recording head further includes: a nonmagnetic layer 8 made of a nonmagnetic material and disposed on the top surface of the top shield layer 7; and a return magnetic pole layer 10 made of a magnetic material and disposed on the nonmagnetic layer 8. The nonmagnetic layer 8 is made of alumina, for example.

The heat-assisted magnetic recording head further includes: a coupling layer 11 made of a magnetic material and disposed on a part of the top surface of the return magnetic pole layer 10 away from the medium facing surface 40; and an insulating layer 12 disposed around the coupling layer 11 on the top surface of the return magnetic pole layer 10. The insulating layer 12 is made of alumina, for example.

The heat-assisted magnetic recording head further includes: a coupling layer 13 made of a magnetic material and disposed on the coupling layer 11; a heat sink layer 14 disposed on a part of the top surface of the insulating layer 12; and an insulating layer 15 disposed around the coupling layer 13 and the heat sink layer 14 on the top surface of the insulating layer 12. An end face of the heat sink layer 14 closer to the medium facing surface 40 is located at a distance from the medium facing surface 40. A part of the insulating layer 15 is interposed between the end face of the heat sink layer 14 and the medium facing surface 40. The heat sink layer 14 is made of a material having a high thermal conductivity, such as SiC. The insulating layer 15 is made of alumina, for example. The coupling layer 13, the heat sink layer 14, and the insulating layer 15 are flattened at the top.

The heat-assisted magnetic recording head further includes: a near-field light generating element 16 disposed on top of the heat sink layer 14 and the insulating layer 15 in the vicinity of the medium facing surface 40; a coupling layer 17 made of a magnetic material and disposed on the coupling layer 13; and a surrounding layer 18 disposed on top of the heat sink layer 14 and the insulating layer 15 and surrounding the near-field light generating element 16 and the coupling layer 17. The surrounding layer 18 may thinly cover the near-field light generating element 16. The near-field light generating element 16 is made of a metal. Specifically, the near-field light generating element 16 is made of one of Au, Ag, Al, Cu, Pd, Pt, Rh and Ir, or of an alloy composed of two or more of these elements. At least part of the surrounding layer 18 is made of a non-metallic inorganic material. The coupling layer 17 and the surrounding layer 18 are flattened at the top.

The heat-assisted magnetic recording head further includes: a clad layer 19 disposed over the top surfaces of the coupling layer 17 and the surrounding layer 18; and a waveguide 20 and a magnetic pole 20 that are disposed on the clad layer 19. The waveguide 20 is made of a dielectric material that transmits laser light to be used for generating near-field light. The laser light emitted from a not-shown laser diode enters the waveguide 20 and is propagated through the waveguide 20. The clad layer 19 is made of a dielectric material that has a refractive index lower than that of the waveguide 20. For example, the waveguide 20 can be made of $Ta_2O_5$ which has a refractive index of approximately 2.1, and the clad layer 19 can be made of alumina which has a refractive index of approximately 1.8.

The waveguide 20 includes a first layer 20A lying on the clad layer 19 and a second layer 20B lying on the first layer 20A. The magnetic pole 22 includes a first layer 22A lying on the clad layer 19, a second layer 22B lying on the first layer 22A, and a third layer 22C lying on the second layer 22B.

The heat-assisted magnetic recording head further includes clad layers 21 and 23. The clad layer 21 is disposed around the first layer 20A of the waveguide 20 and the first layer 22A of the magnetic pole 22 on the clad layer 19. The clad layer 23 is disposed around the second layer 20B of the waveguide 20 and the second layer 22B of the magnetic pole 22 on the clad layer 21. A part of the clad layer 23 covers the top surface of the second layer 20B. The clad layers 21 and 23 are each made of a dielectric material that has a refractive index lower than that of the waveguide 20. If the waveguide 20 is made of $Ta_2O_5$, the clad layers 21 and 23 can be made of alumina, for example.

The heat-assisted magnetic recording head further includes: a coupling layer 24 made of a magnetic material and disposed on a part of the clad layer 23 above the coupling layer 17; and an insulating layer 25 disposed around the third layer 22C of the magnetic pole 22 and the coupling layer 24 on the clad layer 23. The insulating layer 25 is made of alumina, for example. The coupling layer 24 is magnetically coupled to the coupling layer 17 via two coupling portions to be described later.

The heat-assisted magnetic recording head further includes: a coupling layer 26 made of a magnetic material and disposed on the third layer 22C of the magnetic pole 22; and a coupling layer 27 made of a magnetic material and disposed on the coupling layer 24.

The heat-assisted magnetic recording head further includes: an insulating layer 28 disposed on the insulating layer 25; a plurality of first coil elements 30A disposed on the insulating layer 28; and an insulating layer 31 disposed around the coupling layers 26 and 27 and the first coil elements 30A. FIG. 5 shows the first coil elements 30A. The first coil elements 30A are arranged to align in the Y direction. Each first coil element 30A has a main part that extends in the track width direction (the X direction). Each first coil element 30A is made of a conductive material such as copper. The insulating layers 28 and 31 are made of alumina, for example.

The heat-assisted magnetic recording head further includes: an insulating layer 32 disposed to cover the first coil elements 30A; and a yoke layer 33 made of a magnetic material and disposed over the coupling layers 26 and 27 and the insulating layer 32. The yoke layer 33 magnetically couples the coupling layer 26 to the coupling layer 27. The insulating layer 32 is made of alumina, for example.

The heat-assisted magnetic recording head further includes: an insulating layer 34 disposed to cover the yoke layer 33; a plurality of second coil elements 30B disposed on the insulating layer 34; a lead layer 30C disposed on the insulating layer 34; and a protection layer 35 disposed to cover the second coil elements 30B and the lead layer 30C. The insulating layer 34 and the protection layer 35 are made of alumina, for example.

FIG. 6 shows the second coil elements 30B and the lead layer 30C. The second coil elements 30B are arranged to align in the Y direction. Each second coil element 30B has a main part that extends in the track width direction (the X direction). Each second coil element 30B and the lead layer 30C are made of a conductive material such as copper.

As shown in FIG. 5 and FIG. 6, the heat-assisted magnetic recording head further includes a plurality of connecting portions 36 and a connecting portion 37. The plurality of connecting portions 36 connect the plurality of first coil elements 30A to the plurality of second coil elements 30B so as to form a coil 30 wound around the yoke layer 33 helically. The connecting portion 37 connects one of the first coil elements 30A to the lead layer 30C. The connecting portions 36 and the connecting portion 37 are provided to penetrate through the insulating layer 34. The connecting portions 36 and the connecting portion 37 are each made of a conductive material such as copper.

FIG. 5 further shows two coupling portions 29A and 29B that couple the coupling layer 24 to the coupling layer 17. The coupling portions 29A and 29B are provided to penetrate through the clad layers 19, 21, and 23. The coupling portions 29A and 29B are disposed on opposite sides of the waveguide 20 in the track width direction (the X direction), each being spaced from the waveguide 20. Although not shown, each of the coupling portions 29A and 29B includes a first layer lying on the coupling layer 17 and a second layer lying on the first layer.

The parts from the return magnetic pole layer 10 to the second coil elements 30B constitute a write head. The coil 30, which is composed of the first coil elements 30A, the second coil elements 30B and the connecting portions 36, produces a magnetic field corresponding to data to be written on the recording medium. The return magnetic pole layer 10, the coupling layers 11, 13 and 17, the coupling portions 29A and 29B, the coupling layers 24 and 27, the yoke layer 33, the coupling layer 26, and the magnetic pole 22 form a magnetic path for passing a magnetic flux corresponding to the magnetic field produced by the coil 30. The magnetic pole 22 allows the magnetic flux corresponding to the magnetic field produced by the coil 30 to pass, and produces a write magnetic field for writing data on the recording medium by means of a perpendicular magnetic recording system.

As has been described, the heat-assisted magnetic recording head according to the present embodiment includes the medium facing surface 40 that faces the recording medium, the read head, and the write head. The read head and the write head are stacked on the substrate 1. Relative to the read head, the write head is located on the front side (trailing side) in the direction of travel of the recording medium (the Z direction).

The read head includes: the MR element 5 as the read element; the bottom shield layer 3 and the top shield layer 7 for shielding the MR element 5, the bottom shield layer 3 and the top shield layer 7 having their respective portions that are located near the medium facing surface 40 and are opposed to each other with the MR element 5 therebetween; the bottom shield gap film 4 disposed between the MR element 5 and the bottom shield layer 3; and the top shield gap film 6 disposed between the MR element 5 and the top shield layer 7.

The write head includes the coil 30, the magnetic pole 22, the waveguide 20, and the near-field light generating element 16. The coil 30 produces a magnetic field corresponding to data to be written on the recording medium. The magnetic pole 22 allows the magnetic flux corresponding to the magnetic field produced by the coil 30 to pass, and produces a write magnetic field for writing data on the recording medium by means of the perpendicular magnetic recording system. The waveguide 20 propagates the laser light emitted from the not-shown laser diode.

A description will now be given of the near-field light generating element 16 with reference to FIG. 4. As shown in FIG. 4, the near-field light generating element 16 has a near-field light generating part 16g located in the medium facing surface 40. The near-field light generating element 16 is in the shape of a triangular prism, having an outer surface as described below. The outer surface of the near-field light generating element 16 includes: a bottom surface 16a; first and second inclined surfaces 16b and 16c that are each connected to the bottom surface 16a, the first and second inclined surfaces 16b and 16c decreasing in distance from each other with increasing distance from the bottom surface 16a; and an edge part 16d that connects the first and second inclined surfaces 16b and 16c to each other. The bottom surface 16a has two sides 16a1 and 16a2 that are each parallel to the direction perpendicular to the medium facing surface 40 (the Y direction). The bottom end of the first inclined surface 16b is connected to the side 16a1, and the bottom end of the second inclined surface 16c is connected to the side 16a2. The top end of the first inclined surface 16b and the top end of the second inclined surface 16c are connected to each other at the edge part 16d.

The outer surface of the near-field light generating element 16 further includes a frond end face 16e located in the medium facing surface 40, and a rear end face 16f opposite to the front end face 16e. The front end face 16e and the rear end face 16f each connect the bottom surface 16a and the first and second inclined surfaces 16b and 16c to each other.

The front end face 16e has: a first side 16e1 that lies at an end of the first inclined surface 16b; a second side 16e2 that lies at an end of the second inclined surface 16c; a third side 16e3 that lies at an end of the bottom surface 16a; and a tip 16e4 that is formed by contact of the first side 16e1 and the second side 16e2 with each other and forms the near-field light generating part 16g. The near-field light generating part 16g refers to the tip 16e4 and its vicinity in the front end face 16e.

Here, the length of the near-field light generating element 16 in the direction perpendicular to the medium facing surface 40 (the Y direction) will be denoted by the symbol $H_{PA}$; the length of the third side 16e3 of the front end face 16e will be denoted by the symbol $W_{PA}$; and the length of the front end face 16e in the direction perpendicular to the bottom surface 16a (the Z direction) will be denoted by the symbol $T_{PA}$. $H_{PA}$ is greater than $T_{PA}$. Both of $W_{PA}$ and $T_{PA}$ are smaller than or equal to the wavelength of light that is propagated through the waveguide 20. $W_{PA}$ falls within the range of 100 to 500 nm, for example. $T_{PA}$ falls within the range of 100 to 500 nm, for example. $H_{PA}$ falls within the range of 0.25 to 2.5 μm, for example.

The angle that the first inclined surface 16b forms with respect to the direction perpendicular to the bottom surface 16a (the Z direction) is equal to the angle that the second inclined surface 16c forms with respect to the direction perpendicular to the bottom surface 16a (the Z direction). Hereinafter, this angle will be represented by θ. The angle θ falls within the range of 30 to 60 degrees, for example.

As shown in FIG. 1, the magnetic pole 22 has a bottom end (bottom end of the first layer 22A) that is opposed to the edge part 16d with a predetermined distance therebetween. The waveguide 20 has a bottom surface (bottom surface of the first layer 20A) that is opposed to the edge part 16d with a predetermined distance therebetween. At least the clad layer 19 is interposed between the edge part 16d and the bottom end of the magnetic pole 22, and between the edge part 16d and the bottom surface of the waveguide 20. In addition to the clad layer 19, the surrounding layer 18 may also be interposed between the edge part 16d and the bottom end of the magnetic pole 22, and between the edge part 16d and the bottom surface of the waveguide 20. The distance from the edge part 16d to each of the bottom end of the magnetic pole 22 and the bottom surface of the waveguide 20 falls within the range of 5 to 50 nm, for example.

Now, the principle of generation of near-field light in the present embodiment and the principle of heat-assisted magnetic recording using the near-field light will be described in detail. The laser light emitted from the not-shown laser diode enters the waveguide 20. As shown in FIG. 2, the laser light 50 is propagated through the waveguide 20 toward the medium facing surface 40, and reaches the vicinity of the near-field light generating element 16. The laser light 50 is then totally reflected at the bottom surface of the waveguide 20. This generates evanescent light permeating into the clad layer 19 and into the surrounding layer 18 therebelow. As a result, the evanescent light and the collective oscillations of charges on the edge part 16d and its vicinity in the near-field light generating element 16, i.e., surface plasmons, are coupled with each other to excite a system of surface plasmon polaritons. In this way, surface plasmons are excited on the edge part 16d and its vicinity in the near-field light generating element 16.

The surface plasmons excited on the near-field light generating element 16 are propagated along the edge part 16d toward the near-field light generating part 16g. Consequently, the surface plasmons concentrate at the near-field light generating part 16g, and the near-field light generating part 16g generates near-field light based on the surface plasmons. The near-field light is projected toward the recording medium, reaches the surface of the recording medium and heats a part of the magnetic recording layer of the recording medium. This lowers the coercivity of the part of the magnetic recording layer. In heat-assisted magnetic recording, the part of the magnetic recording layer with the lowered coercivity is subjected to a write magnetic field produced by the magnetic pole 22 for performing data writing.

Now, with reference to FIG. 2 and FIG. 3, a description will be given of a method of manufacturing the heat-assisted magnetic recording head according to the present embodiment. The method of manufacturing the heat-assisted magnetic recording head according to the present embodiment includes the steps of forming components of a plurality of heat-assisted magnetic recording heads other than the substrates 1 on a substrate that includes portions to become the substrates 1 of the plurality of heat-assisted magnetic recording heads, thereby fabricating a substructure that includes pre-head portions arranged in a plurality of rows, the pre-head portions being intended to become the heat-assisted magnetic recording heads later; and forming the plurality of heat-assisted magnetic recording heads by cutting the substructure to separate the plurality of pre-head portions from each other. In the step of forming the plurality of heat-assisted magnetic recording heads, the surfaces formed by cutting are polished into the medium facing surfaces 40.

The method of manufacturing the heat-assisted magnetic recording head according to the present embodiment will now be described in more detail with attention focused on a single heat-assisted magnetic recording head. In the method of manufacturing the heat-assisted magnetic recording head according to the present embodiment, the insulating layer 2 is initially formed on the substrate 1. Next, the bottom shield layer 3 is formed on the insulating layer 2. Next, the bottom shield gap film 4 is formed on the bottom shield layer 3. Next, the MR element 5 and the not-shown two leads connected to the MR element 5 are formed on the bottom shield gap film 4. Next, the top shield gap film 6 is formed to cover the MR element 5 and the leads. Next, the top shield layer 7 is formed on the top shield gap film 6. Next, the nonmagnetic layer 8 is formed on the top shield layer 7. Next, the return magnetic pole layer 10 is formed on the nonmagnetic layer 8.

Next, the coupling layer 11 is formed on the return magnetic pole layer 10. Next, the insulating layer 12 is formed to cover the coupling layer 11. The insulating layer 12 is then polished by, for example, chemical mechanical polishing (hereinafter referred to as CMP), until the coupling layer 11 is exposed. This flattens the coupling layer 11 and the insulating layer 12 at the top. Next, the coupling layer 13 is formed on the coupling layer 11, and the heat sink layer 14 is formed on the insulating layer 12. Next, the insulating layer 15 is formed to cover the coupling layer 13 and the heat sink layer 14. The insulating layer 15 is then polished by, for example, CMP, until the coupling layer 13 and the heat sink layer 14 are exposed. This flattens the coupling layer 13, the heat sink layer 14, and the insulating layer 15 at the top.

Next, the coupling layer 17 is formed on the coupling layer 13, and the near-field light generating element 16 and the surrounding layer 18 are formed on top of the heat sink layer 14 and the insulating layer 15. The step of forming the near-field light generating element 16 and the surrounding layer 18 will be described in detail later.

Next, the clad layer 19 is formed over the coupling layer 17 and the surrounding layer 18. The clad layer 19 has two openings that are located above the coupling layer 17. The two openings are intended for passing the coupling portions 29A and 29B therethrough. Next, the respective first layers of the coupling portions 29A and 29B are formed to be coupled to the coupling layer 17 through the two openings. The first layer 20A of the waveguide 20, the first layer 22A of the magnetic pole 22, and the clad layer 21 are formed on the clad layer 19.

Next, the second layer 20B of the waveguide 20 is formed on the first layer 20A, and the second layer 22B of the magnetic pole 22 is formed on the first layer 22A. The respective second layers of the coupling portions 29A and 29B are formed on the respective first layers of the coupling portions 29A and 29B. Next, the clad layer 23 is formed to cover the second layer 20B, the second layer 22B, and the respective second layers of the coupling portions 29A and 29B. Next, the clad layer 23 is polished by, for example, CMP, until the second layer 22B and the respective second layers of the coupling portions 29A and 29B are exposed.

Next, the third layer 22C of the magnetic pole 22 is formed on the second layer 22B, and the coupling layer 24 is formed to be coupled to the coupling portions 29A and 29B. Next, the insulating layer 25 is formed to cover the third layer 22C and the coupling layer 24. The insulating layer 25 is then polished by, for example CMP, until the third layer 22C and the coupling layer 24 are exposed.

Next, the insulating layer 28 is formed on the insulating layer 25. Next, the first coil elements 30A are formed on the insulating layer 28. The coupling layer 26 is formed on the third layer 22C of the magnetic pole 22, and the coupling layer 27 is formed on the coupling layer 24. Next, the insulating layer 31 is formed to cover the first coil elements 30A and the coupling layers 26 and 27. The insulating layer 31 is then polished by, for example, CMP, until the first coil elements 30A and the coupling layers 26 and 27 are exposed.

Next, the insulating layer 32 is formed to cover the first coil elements 30A. The insulating layer 32 has a plurality of openings for passing the connecting portions 36 and 37 therethrough. Next, the connecting portions 36 and 37 are formed to be connected to the first coil elements 30A through the plurality of openings. Next, the yoke layer 33 is formed over the coupling layers 26 and 27 and the insulating layer 32. Next, the insulating layer 34 is formed to cover the yoke layer 33 and the connecting portions 36 and 37. The insulating layer 34 is then polished by, for example, CMP, until the connecting portions 36 and 37 are exposed.

Next, the second coil elements 30B and the lead layer 30C are formed on the connecting portions 36 and 37 and the insulating layer 34. Next, the protection layer 35 is formed to cover the second coil elements 30B and the lead layer 30C. Wiring, terminals, and other components are then formed on the top surface of the protection layer 35.

When the substructure is completed thus, the substructure is cut to separate the plurality of pre-head portions from each other, followed by the polishing of the medium facing surface 40 and the fabrication of flying rails etc. This completes the heat-assisted magnetic recording head.

The step of forming the near-field light generating element 16 and the surrounding layer 18 will now be described in detail with reference to FIG. 7 to FIG. 18. The step of forming the near-field light generating element 16 and the surrounding layer 18 includes forming the near-field light generating element 16. The following description includes the description of the method of manufacturing the near-field light generating element 16 according to the present embodiment. FIG. 7 to FIG. 18 each show a cross section of a stack of layers in the process of forming the near-field light generating element 16 and the surrounding layer 18, the cross section being taken at the position where the medium facing surface 40 is to be formed.

Figure 7:
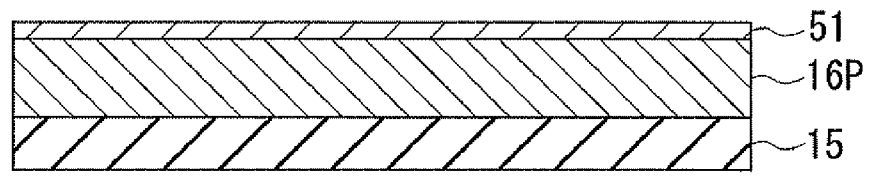
FIG. 7 is a cross-sectional view showing a step of a method of manufacturing the heat-assisted magnetic recording head according to the first embodiment of the invention.

FIG. 7 shows a step after the formation of the heat sink layer 14 and the insulating layer 15. In this step, a metal layer 16P is initially formed over the heat sink layer 14 and the insulating layer 15 by sputtering, for example. The metal layer 16P is to be etched later to become the near-field light generating element 16. The metal layer 16P has a thickness in the range of 100 to 500 nm, for example. Next, a polishing stopper layer 51 is formed on the metal layer 16P by sputtering, for example. The polishing stopper layer 51 is intended for use in a polishing step to be performed later. The polishing stopper layer 51 has a thickness in the range of 20 to 60 nm, for example. The polishing stopper layer 51 includes a layer of Ta or Ru, for example. The polishing stopper layer 51 may include a first layer of Ta or Ru, for example, and a second layer of NiCr, for example, which is formed on the first layer.

Figure 8:
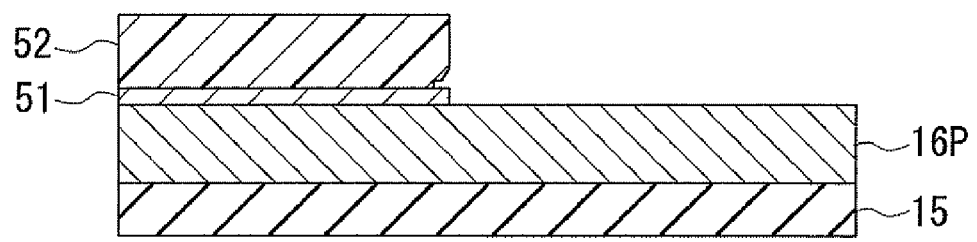
FIG. 8 is an explanatory diagram showing a step that follows the step of FIG. 7.

FIG. 8 shows the next step. In this step, a photoresist mask 52 is initially formed on the polishing stopper layer 51. Next, the polishing stopper layer 51 is etched by, for example, ion beam etching (hereinafter referred to as IBE) or reactive ion etching (hereinafter referred to as RIE), by using the photoresist mask 52 as the etching mask. The polishing stopper layer 51 thus etched covers an area of the metal layer 16P where the second inclined surface 16c is to be formed later.

Figure 9:
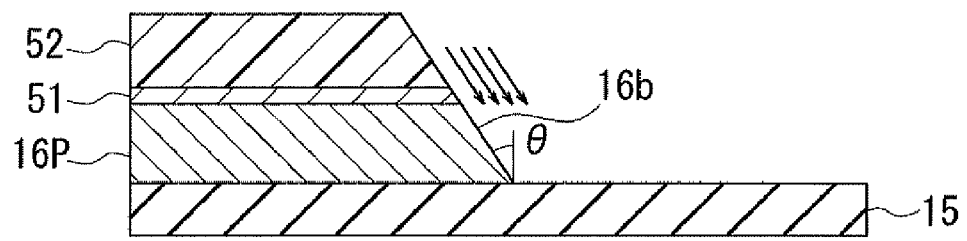
FIG. 9 is a cross-sectional view showing a step that follows the step of FIG. 8.

FIG. 9 shows the next step. In this step, the polishing stopper layer 51 and the metal layer 16P are initially etched by, for example, IBE by using the photoresist mask 52 as the etching mask. This step will be referred to as a first etching step. In the first etching step, the angle that the direction of travel of the ion beam forms with respect to the direction perpendicular to the bottom surface of the metal layer 16P is made equal to the angle θ that the first inclined surface 16b forms with respect to the direction perpendicular to the bottom surface 16a in the near-field light generating element 16. This provides the metal layer 16P with the first inclined surface 16b. The photoresist mask 52 is then removed.

Figure 10:
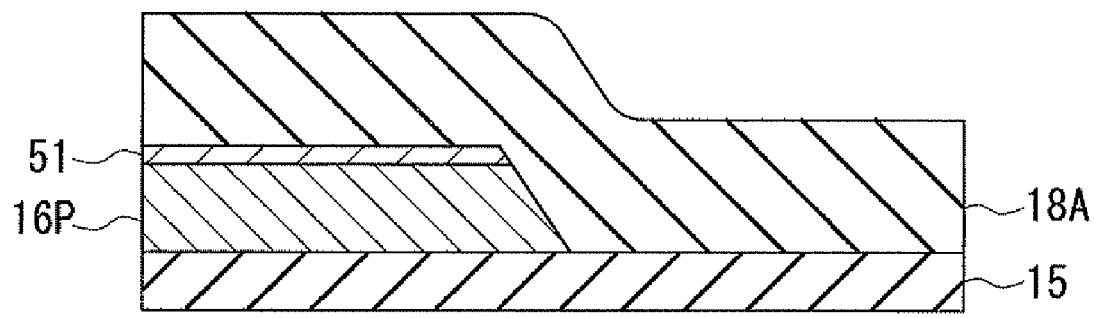
FIG. 10 is a cross-sectional view showing a step that follows the step of FIG. 9.

FIG. 10 shows the next step. In this step, a coating layer 18A is formed to cover the polishing stopper layer 51 and the metal layer 16P provided with the first inclined surface 16b. The coating layer 18A is formed also over the heat sink layer 14 and the insulating layer 15. The coating layer 18A is formed to have such a thickness that the top surface of the portion formed over the heat sink layer 14 and the insulating layer 15 lies at a level higher than the top surface of the polishing stopper layer 51. The thickness of the coating layer 18A falls within the range of 0.2 to 0.8 μm, for example. The coating layer 18A is made of a non-metallic inorganic material that has an etching rate lower than that of the metal layer 16P in a second etching step to be performed later. While the material of the coating layer 18A may be either an inorganic dielectric material or an inorganic semiconductor material, the former is preferred. The coating layer 18A may be made of one selected from the group consisting of $Al_2O_3$, $SiO_2$, $Ta_2O_5$, SiC, and TiN.

Figure 11:
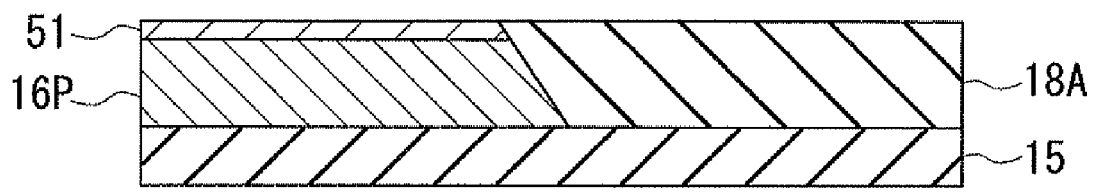
FIG. 11 is a cross-sectional view showing a step that follows the step of FIG. 10.

FIG. 11 shows the next step. In this step, the coating layer 18A is polished by, for example, CMP, until the polishing stopper layer 51 is exposed. This step will be referred to as a polishing step.

Figure 12:
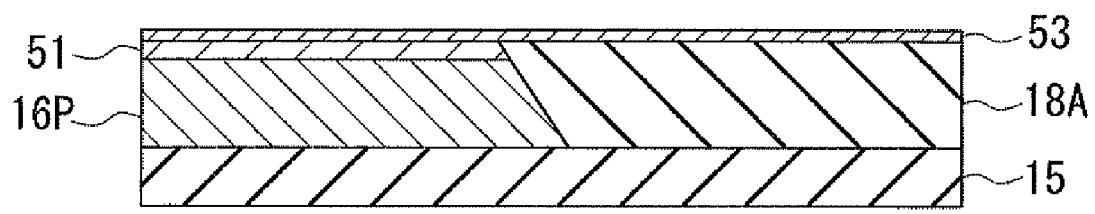
FIG. 12 is a cross-sectional view showing a step that follows the step of FIG. 11.

FIG. 12 shows the next step. In this step, a second polishing stopper layer 53 is formed over the polishing stopper layer 51 and the coating layer 18A. The second polishing stopper layer 53 is intended for use in a second polishing step to be performed later. The thickness and material of the second polishing stopper layer 53 are the same as those of the polishing stopper layer 51.

Figure 13:
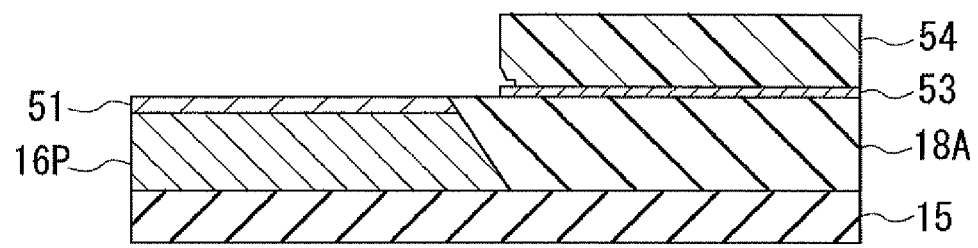
FIG. 13 is a cross-sectional view showing a step that follows the step of FIG. 12.

FIG. 13 shows the next step. In this step, a photoresist mask 54 is initially formed on the second polishing stopper layer 53. Next, the second polishing stopper layer 53 is etched by, for example, IBE or RIE, by using the photoresist mask 54 as the etching mask. After the etching, the second polishing stopper layer 53 no longer lies on the polishing stopper layer 51 but lies on the coating layer 18A.

Figure 14:
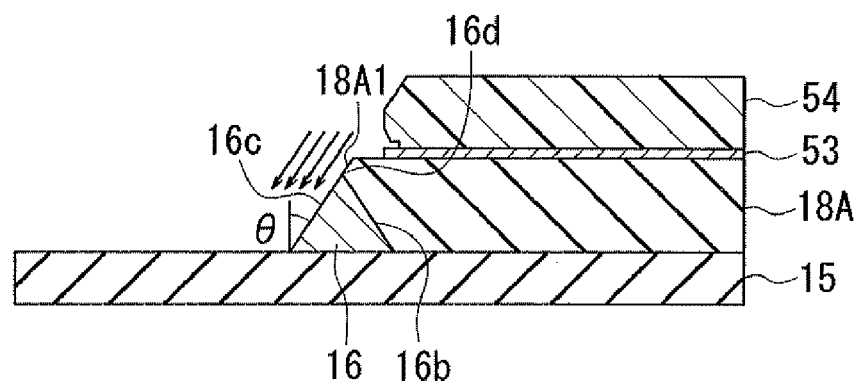
FIG. 14 is a cross-sectional view showing a step that follows the step of FIG. 13.

FIG. 14 shows the next step. In this step, the polishing stopper layer 51 and the metal layer 16P are initially etched by, for example, IBE, by using the coating layer 18A polished in the polishing step as the etching mask. This step will be referred to as a second etching step. In the second etching step, the angle that the direction of travel of the ion beam forms with respect to the direction perpendicular to the bottom surface of the metal layer 16P is made equal to the angle θ that the second inclined surface 16c forms with respect to the direction perpendicular to the bottom surface 16a in the near-field light generating element 16. This provides the metal layer 16P with the second inclined surface 16c and the edge part 16d, and thereby makes the metal layer 16P into the near-field light generating element 16. The photoresist mask 54 is then removed.

In the second etching step, as shown in FIG. 14, the coating layer 18A is slightly etched, so that the coating layer 18A is provided with an inclined surface 18A1 continuous with the second inclined surface 16c. In the second etching step, the coating layer 18A has an etching rate lower than that of the metal layer 16P. Thus, in the second etching step, the inclined surface 18A1 is formed to constitute a single flat surface with the second inclined surface 16c without being rounded. Consequently, the edge part 16d is formed into a sharply pointed shape without being rounded.

Figure 15:
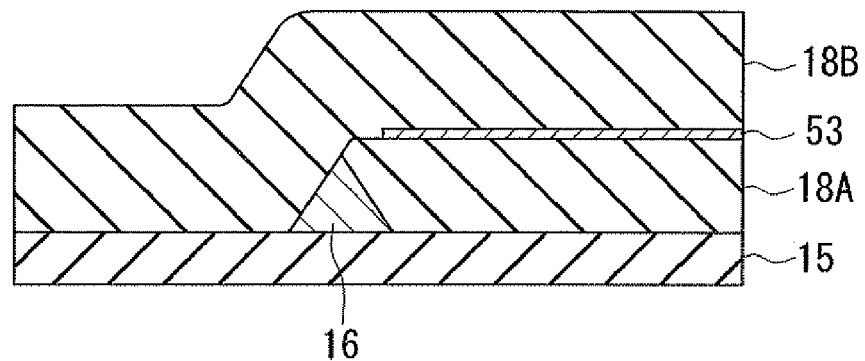
FIG. 15 is a cross-sectional view showing a step that follows the step of FIG. 14.

FIG. 15 shows the next step. In this step, a second coating layer 18B is formed to cover the near-field light generating element 16, the coating layer 18A, and the second polishing stopper layer 53. The second coating layer 18B is formed also over the heat sink layer 14 and the insulating layer 15. The second coating layer 18B is formed to have such a thickness that the top surface of the portion formed over the heat sink layer 14 and the insulating layer 15 lies at a level higher than the top surface of the second polishing stopper layer 53. The thickness of the second coating layer 18B falls within the range of 0.2 to 0.8 μm, for example. While the second coating layer 18B can be made of any material other than conductive materials, it is preferred that the second coating layer 18B be made of the same material as the coating layer 18A.

Figure 16:
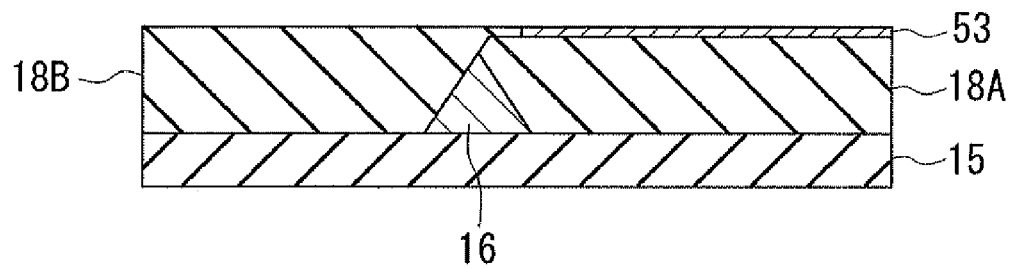
FIG. 16 is a cross-sectional view showing a step that follows the step of FIG. 15.

FIG. 16 shows the next step. In this step, the second coating layer 18B is polished by, for example, CMP, until the second polishing stopper layer 53 is exposed. This step will be referred to as a second polishing step.

Figure 17:
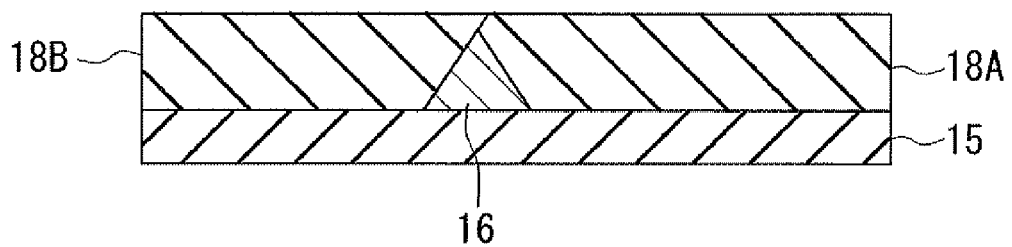
FIG. 17 is a cross-sectional view showing a step that follows the step of FIG. 16.

FIG. 17 shows the next step. In this step, IBE or RIE, for example, is performed to remove the second polishing stopper layer 53 and slightly etch the second coating layer 18B so that the coating layer 18A and the second coating layer 18B are flattened at the top. The coating layer 18A and the second coating layer 18B remaining after this step constitute the surrounding layer 18.

Figure 18:
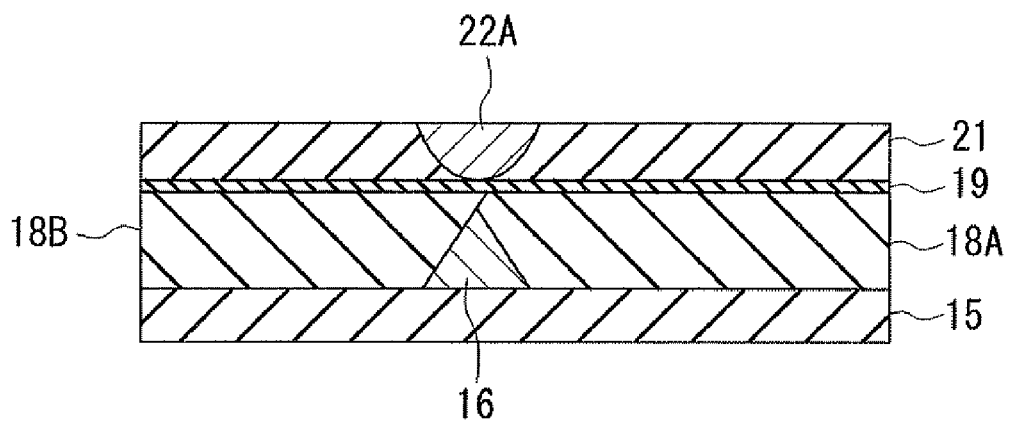
FIG. 18 is a cross-sectional view showing a step that follows the step of FIG. 17.

The near-field light generating element 16 and the surrounding layer 18 are formed through the series of steps shown in FIG. 7 to FIG. 17. FIG. 18 shows a step after the formation of the near-field light generating element 16 and the surrounding layer 18. In this step, the clad layer 19 is initially formed on the surrounding layer 18. Next, the clad layer 21, the first layer 22A of the magnetic pole 22, and the first layer 20A (not shown) of the waveguide 20 are formed on the clad layer 19.

As has been described, the heat-assisted magnetic recording head according to the present embodiment includes the near-field light generating element 16, the waveguide 20, and the magnetic pole 22. The outer surface of the near-field light generating element 16 includes the bottom surface 16a, the first and second inclined surfaces 16b and 16c, and the edge part 16d that connects the first and second inclined surfaces 16b and 16c to each other. The outer surface of the near-field light generating element 16 further includes the front end face 16e located in the medium facing surface, and the rear end face 16f opposite to the front end face 16e. The front end face 16e has the first side 16e1 lying at an end of the first inclined surface 16b, the second side 16e2 lying at an end of the second inclined surface 16c, the third side 16e3 lying at an end of the bottom surface 16a, and the tip 16e4 that is formed by contact of the first side 16e1 and the second side 16e2 with each other and forms the near-field light generating part 16g.

In the present embodiment, the bottom surface of the waveguide 20 is opposed to the edge part 16d of the near-field light generating element 16 with a predetermined distance therebetween. In the present embodiment, evanescent light occurs from the bottom surface of the waveguide 20 based on the light propagated through the waveguide 20. Based on the evanescent light, surface plasmons are then excited on the edge part 16d and its vicinity in the near-field light generating element 16. The surface plasmons are propagated along the edge part 16d to the near-field light generating part 16g, and near-field light occurs from the near-field light generating part 16g based on the surface plasmons. According to the present embodiment, it is possible to increase the efficiency of transformation of the light propagated through the waveguide 20 into the near-field light, as compared with the conventional case where a plasmon antenna is directly irradiated with laser light to produce near-field light.

According to the present embodiment, it is possible suppress a temperature rise of the near-field light generating element 16 because the near-field light generating element 16 is not directly irradiated with the laser light propagated through the waveguide 20. In the present embodiment, the length $H_{PA}$ of the near-field light generating element 16 in the direction perpendicular to the medium facing surface 40 is greater than the length $T_{PA}$ of the front end face 16e in the direction perpendicular to the bottom surface 16a of the near-field light generating element 16. Thus, the near-field light generating element 16 of the present embodiment is greater in volume than a conventional plasmon antenna in which the length in the direction perpendicular to the medium facing surface 40 is smaller than the length in the direction perpendicular to the top surface 1a of the substrate 1. This also contributes to suppression of a temperature rise of the near-field light generating element 16. Consequently, according to the present embodiment, it is possible to prevent the near-field light generating element 16 from protruding from the medium facing surface 40.

In the method of manufacturing the near-field light generating element 16 according to the present embodiment, the polishing stopper layer 51 and the metal layer 16P are etched in the second etching step by using the coating layer 18A polished in the polishing step as the etching mask. This provides the metal layer 16P with the second inclined surface 16c and the edge part 16d, and thereby makes the metal layer 16P into the near-field light generating element 16. The coating layer 18A is made of a non-metallic inorganic material that has an etching rate lower than that of the metal layer 16P in the second etching step. According to the present embodiment, as has been described with reference to FIG. 14, it is therefore possible to prevent the edge part 16d from being rounded in the second etching step. The edge part 16d can thus be formed into a sharply pointed shape. Consequently, according to the present embodiment, it is possible to manufacture the near-field light generating element 16 that has the front end face 16e with the top end, i.e., tip 16e4, having a sharply pointed shape. The tip 16e4 forms the near-field light generating part 16g. According to the present embodiment, it is possible to concentrate a lot of surface plasmons at the tip 16e4 (the near-field light generating part 16g) of sharply pointed shape. Consequently, the present embodiment makes it possible to generate near-field light having a small spot diameter and sufficient intensity.

In the present embodiment, the step of forming the near-field light generating element 16 includes the step of forming the second polishing stopper layer 53 on the coating layer 18A between the polishing step and the second etching step. The second polishing stopper layer 53 is intended for use in the second polishing step to be performed later. The method of manufacturing the heat-assisted magnetic recording head according to the present embodiment includes: the step of forming the second coating layer 18B to cover the near-field light generating element 16, the coating layer 18A and the second polishing stopper layer 53 after the second etching step; the second polishing step of polishing the second coating layer 18B until the second polishing stopper layer 53 is exposed; and the step of removing the second polishing stopper layer 53 after the second polishing step. According to the present embodiment, it is thus possible to define the level of the top surface of the second coating layer 18B while preventing the edge part 16d of the near-field light generating element 16 from being polished. Consequently, according to the present embodiment, it is possible to precisely define the distance between the edge part 16d and the magnetic pole 22 and the distance between the edge part 16d and the waveguide 20.

Second Embodiment

A method of manufacturing a near-field light generating element and a method of manufacturing a heat-assisted magnetic recording head according to a second embodiment of the present invention will now be described with reference to FIG. 19 to FIG. 30. FIG. 19 to FIG. 30 show the step of forming the near-field light generating element 16 and the surrounding layer 18 according to the present embodiment. The step of forming the near-field light generating element 16 and the surrounding layer 18 includes forming the near-field light generating element 16. The following description includes the description of the method of manufacturing the near-field light generating element 16 according to the present embodiment. FIG. 19 to FIG. 30 each show a cross section of a stack of layers in the process of forming the near-field light generating element 16 and the surrounding layer 18, the cross section being taken at the position where the medium facing surface 40 is to be formed.

Figure 19:
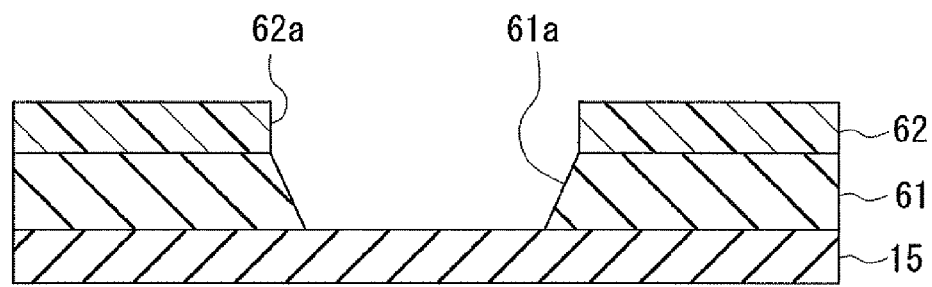
FIG. 19 is a cross-sectional view showing a step of a method of manufacturing a heat-assisted magnetic recording head according to a second embodiment of the invention.

FIG. 19 shows a step after the formation of the heat sink layer 14 and the insulating layer 15. In this step, an accommodating layer 61 is initially formed over the heat sink layer 14 and the insulating layer 15. The accommodating layer 61 is made of a material that has an etching rate lower than that of the metal layer 16P in first and second etching steps to be performed later. The accommodating layer 61 has an accommodating part 61a in which the metal layer 16P is to be accommodated later. Like the coating layer 18A of the first embodiment, the accommodating layer 61 may be made of a non-metallic inorganic material. The accommodating layer 61 has a thickness greater than the length $T_{P4}$ of the front end face 16e of the near-field light generating element 16. The accommodating part 61a penetrates through the accommodating layer 61. The cross section of the accommodating part 61a parallel to the top surfaces of the heat sink layer 14 and the insulating layer 15 increases in size with increasing distance from the top surfaces of the heat sink layer 14 and the insulating layer 15.

The accommodating layer 61 is formed in the following way, for example. First, an initial accommodating layer is formed over the heat sink layer 14 and the insulating layer 15. The initial accommodating layer is to be etched later to become the accommodating layer 61. Next, a photoresist mask 62 having an opening 62a is formed on the initial accommodating layer. Next, the initial accommodating layer is taper-etched by, for example, RIE, by using the photoresist mask 62 as the etching mask. This provides the initial accommodating layer with the accommodating part 61a, and thereby makes the initial accommodating layer into the accommodating layer 61.

Figure 20:
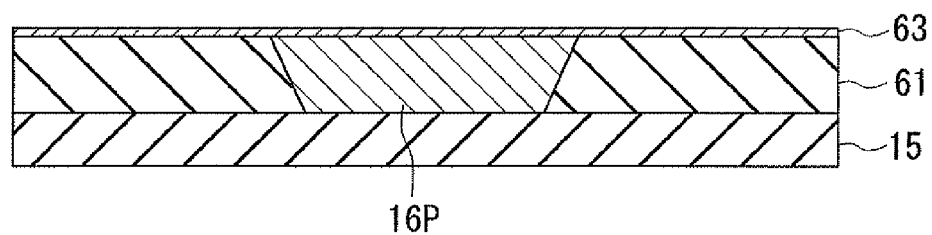
FIG. 20 is a cross-sectional view showing a step that follows the step of FIG. 19.

FIG. 20 shows the next step. In this step, the metal layer 16P is initially formed by, for example, sputtering, so as to be accommodated in the accommodating part 61a. Next, the accommodating layer 61 and the metal layer 16P are flattened at the top by CMP, for example. At this point in time, the metal layer 16P has a thickness in the range of 100 to 500 nm, for example. Next, a polishing stopper layer 63 is formed over the accommodating layer 61 and the metal layer 16P by sputtering, for example. The polishing stopper layer 63 is intended for use in a polishing step to be performed later. The thickness and material of the polishing stopper layer 63 are the same as those of the polishing stopper layer 51 of the first embodiment.

Figure 21:
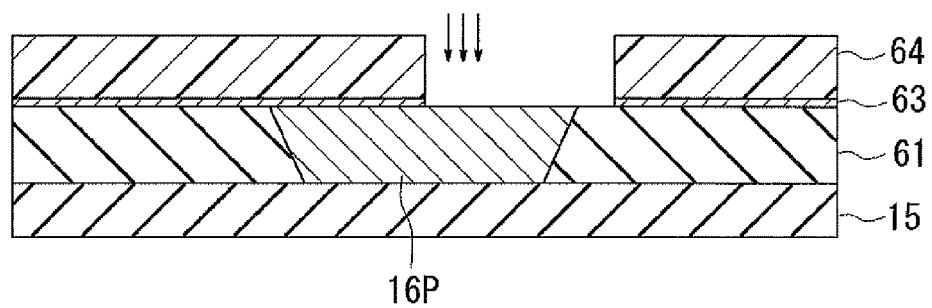
FIG. 21 is a cross-sectional view showing a step that follows the step of FIG. 20.

FIG. 21 shows the next step. In this step, a photoresist mask 64 is initially formed on the polishing stopper layer 63. Next, the polishing stopper layer 63 is etched by, for example, IBE, by using the photoresist mask 64 as the etching mask. The polishing stopper layer 63 thus etched covers an area of the metal layer 16P where the second inclined surface 16c is to be formed later.

Figure 22:
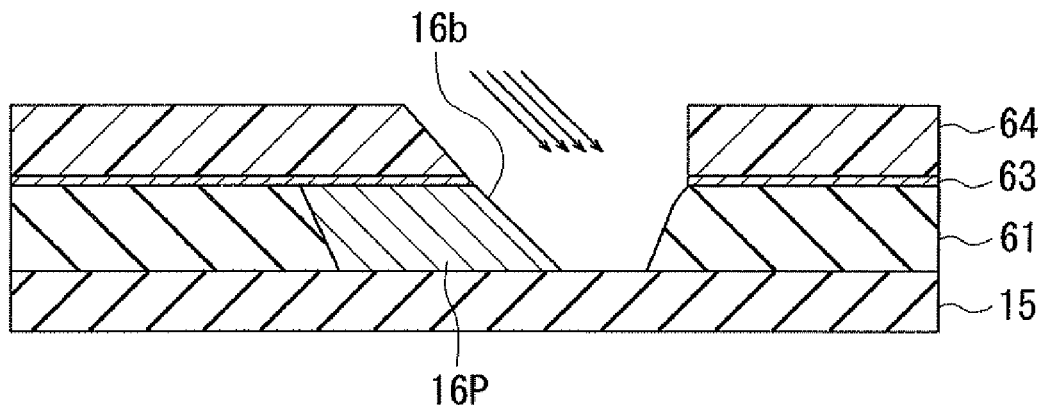
FIG. 22 is a cross-sectional view showing a step that follows the step of FIG. 21.

FIG. 22 shows the next step. In this step, the polishing stopper layer 63 and the metal layer 16P are etched by, for example, IBE, by using the photoresist mask 64 as the etching mask. This step will be referred to as a first etching step. In the first etching step, the angle that the direction of travel of the ion beam forms with respect to the direction perpendicular to the bottom surface of the metal layer 16P is made equal to the angle θ that the first inclined surface 16b forms with respect to the direction perpendicular to the bottom surface 16a in the near-field light generating element 16. This provides the metal layer 16P with the first inclined surface 16b. The photoresist mask 64 is then removed.

Figure 23:
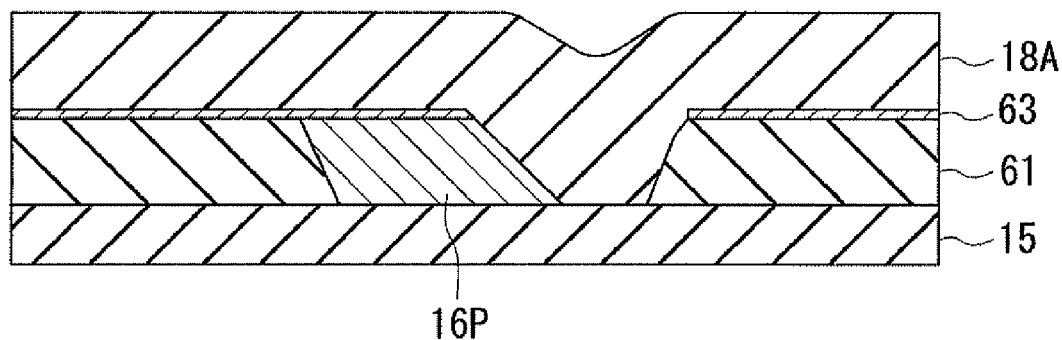
FIG. 23 is a cross-sectional view showing a step that follows the step of FIG. 22.

FIG. 23 shows the next step. In this step, the coating layer 18A is formed to cover the polishing stopper layer 63 and the metal layer 16P provided with the first inclined surface 16b. The coating layer 18A is formed also over the heat sink layer 14 and the insulating layer 15. The coating layer 18A is formed to have such a thickness that the top surface of the portion formed over the heat sink layer 14 and the insulating layer 15 lies at a level higher than the top surface of the second polishing stopper layer 63. The thickness of the coating layer 18A falls within the range of 0.2 to 0.8 μm, for example. The coating layer 18A is made of a non-metallic inorganic material that has an etching rate lower than that of the metal layer 16P in a second etching step to be performed later. The material of the coating layer 18A is the same as in the first embodiment.

Figure 24:
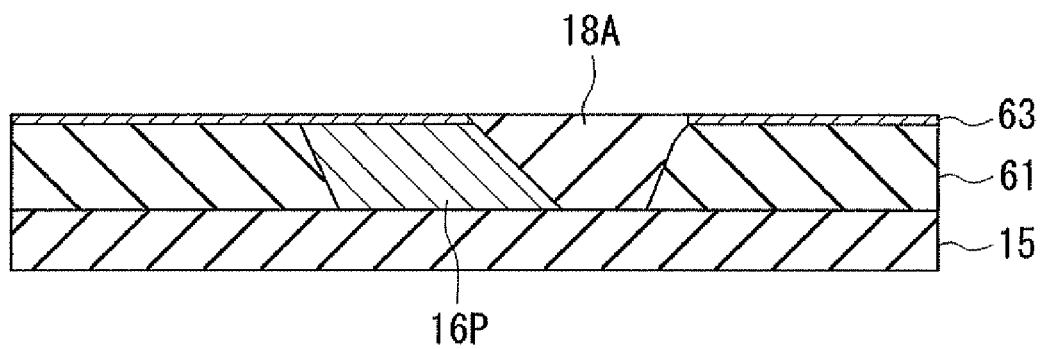
FIG. 24 is a cross-sectional view showing a step that follows the step of FIG. 23.

FIG. 24 shows the next step. In this step, the coating layer 18A is polished by, for example, CMP, until the polishing stopper layer 63 is exposed. This step will be referred to as a polishing step.

Figure 25:
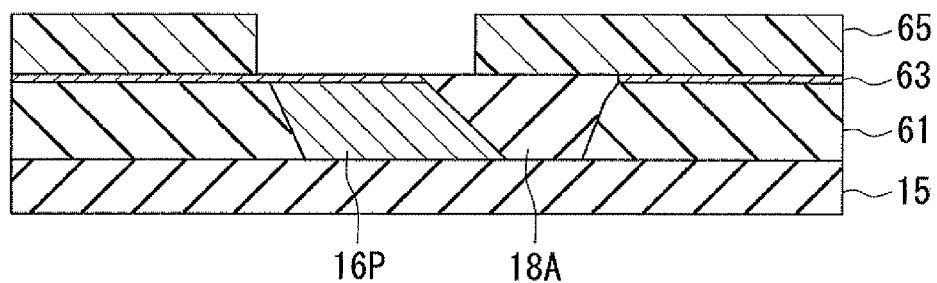
FIG. 25 is a cross-sectional view showing a step that follows the step of FIG. 24.

FIG. 25 shows the next step. In this step, a photoresist mask 65 is formed on top of the polishing stopper layer 63 and the coating layer 18A. The photoresist mask 65 has an opening that is located above a part of the metal layer 16P that is to be etched in the second etching step to be performed later.

Figure 26:
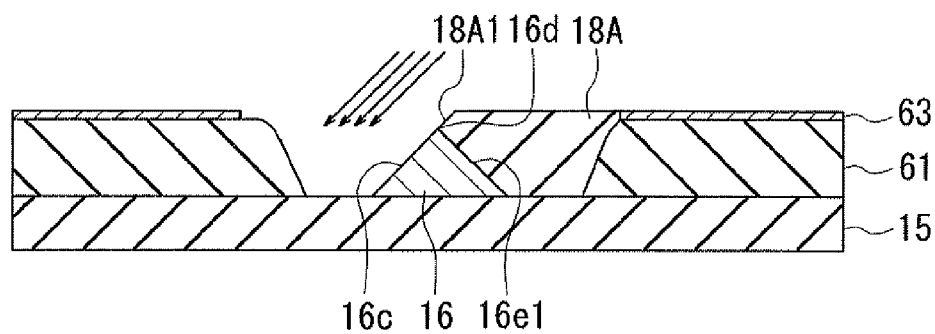
FIG. 26 is a cross-sectional view showing a step that follows the step of FIG. 25.

FIG. 26 shows the next step. In this step, the polishing stopper layer 63 and the metal layer 16P are etched by, for example, IBE, by using the coating layer 18A polished in the polishing step as the etching mask. This step will be referred to as the second etching step. In the second etching step, the angle that the direction of travel of the ion beam forms with respect to the direction perpendicular to the bottom surface of the metal layer 16P is made equal to the angle θ that the second inclined surface 16c forms with respect to the direction perpendicular to the bottom surface 16a in the near-field light generating element 16. This provides the metal layer 16P with the second inclined surface 16c and the edge part 16d, and thereby makes the metal layer 16P into the near-field light generating element 16. The photoresist mask 65 is then removed.

In the second etching step, as shown in FIG. 26, the coating layer 18A is slightly etched, so that the coating layer 18A is provided with an inclined surface 18A1 continuous with the second inclined surface 16c. In the second etching step, the coating layer 18A has an etching rate lower than that of the metal layer 16P. Thus, in the second etching step, the inclined surface 18A1 is formed to constitute a single flat surface with the second inclined surface 16c without being rounded. Consequently, the edge part 16d is formed into a sharply pointed shape without being rounded. After the second etching step, the polishing stopper layer 63 remains on the accommodating layer 61. In the second etching step, the metal layer 16P is preferably etched so that the edge part 16d lies at a level lower than the bottom surface of the polishing stopper layer 63.

Figure 27:
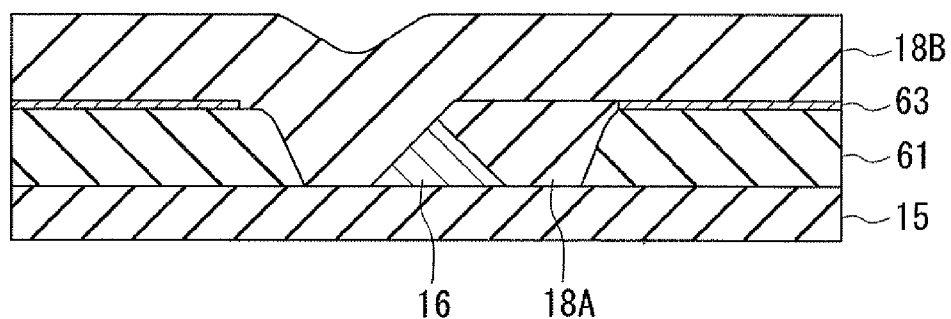
FIG. 27 is a cross-sectional view showing a step that follows the step of FIG. 26.

FIG. 27 shows the next step. In this step, the second coating layer 18B is formed to cover the accommodating layer 61, the polishing stopper layer 63, the near-field light generating element 16, and the coating layer 18A. The second coating layer 18B is formed also over the heat sink layer 14 and the insulating layer 15. The second coating layer 18B is formed to have such a thickness that the top surface of the portion formed over the heat sink layer 14 and the insulating layer 15 lies at a level higher than the top surface of the polishing stopper layer 63. The thickness and material of the second coating layer 18B are the same as in the first embodiment.

Figure 28:
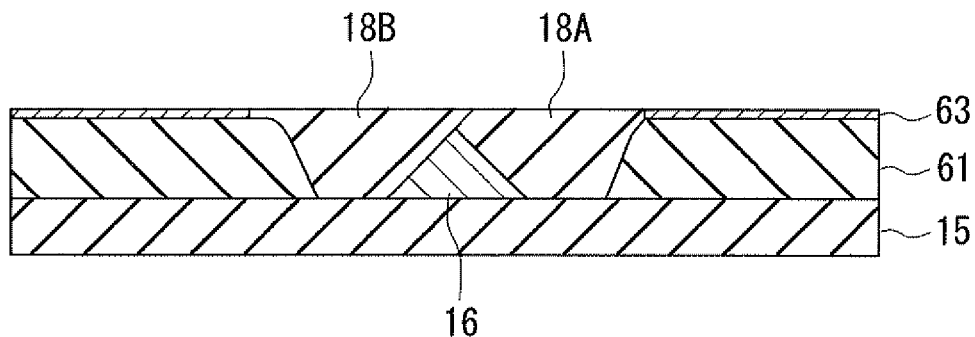
FIG. 28 is a cross-sectional view showing a step that follows the step of FIG. 27.

FIG. 28 shows the next step. In this step, the second coating layer 18B is polished by, for example, CMP, until the polishing stopper layer 63 is exposed. This step will be referred to as a second polishing step.

Figure 29:
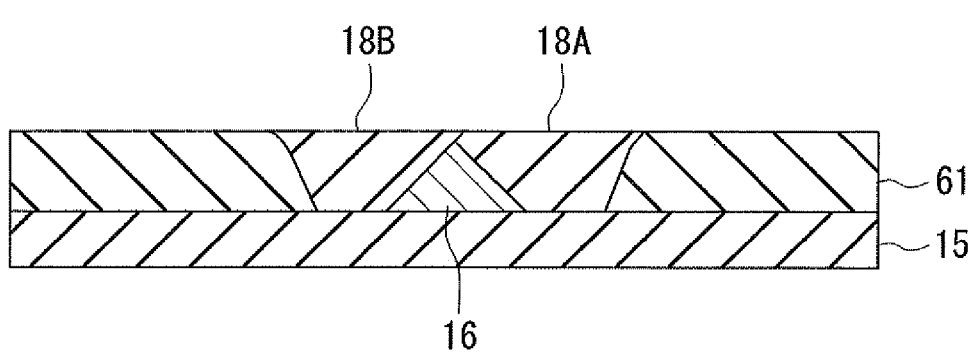
FIG. 29 is a cross-sectional view showing a step that follows the step of FIG. 28.

FIG. 29 shows the next step. In this step, IBE or RIE, for example, is performed to remove the polishing stopper layer 63 and slightly etch the coating layer 18A and the second coating layer 18B so that the accommodating layer 61, the coating layer 18A, and the second coating layer 18B are flattened at the top. The coating layer 18A and the second coating layer 18B remaining after this step constitute the surrounding layer 18.

Figure 30:
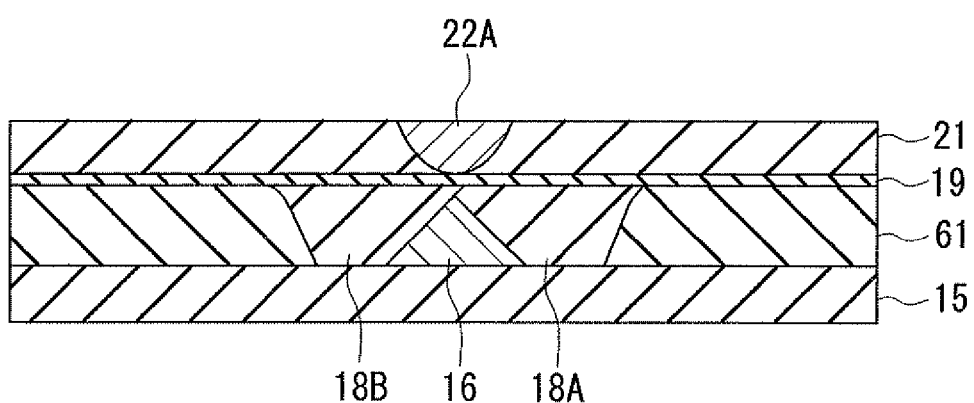
FIG. 30 is a cross-sectional view showing a step that follows the step of FIG. 29.

The near-field light generating element 16 and the surrounding layer 18 are formed through the series of steps shown in FIG. 19 to FIG. 29. FIG. 30 shows a step after the formation of the near-field light generating element 16 and the surrounding layer 18. In this step, the clad layer 19 is initially formed on the surrounding layer 18. Next, the clad layer 21, the first layer 22A of the magnetic pole 22, and the first layer 20A (not shown) of the waveguide 20 are formed on the clad layer 19.

In the present embodiment, the second polishing stopper layer of the first embodiment is not formed. Instead, in the present embodiment, the polishing stopper layer 63 remains on the accommodating layer 61 after the second etching step. The method of manufacturing the heat-assisted magnetic recording head according to the present embodiment includes: the step of forming the second coating layer 18B to cover the accommodating layer 61, the polishing stopper layer 63, the near-field light generating element 16 and the coating layer 18A after the second etching step; the second polishing step of polishing the second coating layer 18B until the polishing stopper layer 63 is exposed; and the step of removing the polishing stopper layer 63 after the second polishing step. According to the present embodiment, it is thus possible to define the level of the top surface of the second coating layer 18B while preventing the edge part 16d of the near-field light generating element 16 from being polished. Consequently, according to the present embodiment, it is possible to precisely define the distance between the edge part 16d and the magnetic pole 22 and the distance between the edge part 16d and the waveguide 20.

The remainder of configuration, function and effects of the present embodiment are similar to those of the first embodiment.

The present invention is not limited to the foregoing embodiments, and various modifications may be made thereto. For example, in the present invention, the clad layer 19 alone may be interposed between the edge part 16d of the near-field light generating element 16 and the bottom surface of the waveguide 20, and between the edge part 16d and the bottom end of the magnetic pole 22, without the intervention of the surrounding layer 18:

It is apparent that the present invention can be carried out in various forms and modifications in the light of the foregoing descriptions. Accordingly, within the scope of the following claims and equivalents thereof, the present invention can be carried out in forms other than the foregoing most preferable embodiments.

What is claimed is:

1. A method of manufacturing a near-field light generating element, the near-field light generating element having a near-field light generating part, a surface plasmon being excited based on light, the surface plasmon being propagated to the near-field light generating part, the near-field light generating part generating near-field light based on the surface plasmon, the near-field light generating element having an outer surface, the outer surface including: a bottom surface; first and second inclined surfaces that are each connected to the bottom surface, the first and second inclined surfaces decreasing in distance from each other with increasing distance from the bottom surface; an edge part that connects the first and second inclined surfaces to each other; and a front end face that connects the bottom surface and the first and second inclined surfaces to each other, the front end face having: a first side that lies at an end of the first inclined surface; a second side that lies at an end of the second inclined surface; a third side that lies at an end of the bottom surface; and a tip that is formed by contact of the first and second sides with each other and forms the near-field light generating part, the method comprising:

a step of forming a metal layer that is to be etched later to become the near-field light generating element;

a step of forming a polishing stopper layer on the metal layer, the polishing stopper layer being intended for use in a polishing step to be performed later;

a first etching step of etching the polishing stopper layer and the metal layer so that the metal layer is provided with the first inclined surface;

a step of forming a coating layer to cover the polishing stopper layer and the metal layer provided with the first inclined surface, the coating layer being made of a non-metallic inorganic material that has an etching rate lower than that of the metal layer in a second etching step to be performed later;

the polishing step of polishing the coating layer until the polishing stopper layer is exposed; and the second etching step of etching the polishing stopper layer and the metal layer by using the coating layer polished in the polishing step as an etching mask so that the metal layer is provided with the second inclined surface and the edge part and thereby becomes the near-field light generating element.

2. The method of manufacturing the near-field light generating element according to claim 1, wherein the coating layer is made of one selected from the group consisting of $Al_2O_3$, $SiO_2$, $Ta_2O_5$, SiC, and TiN.

3. A method of manufacturing a heat-assisted magnetic recording head, the heat-assisted magnetic recording head comprising:

a medium facing surface that faces a recording medium;

a magnetic pole that has an end face located in the medium facing surface and produces a write magnetic field for writing data on the recording medium;

a waveguide that propagates light; and a near-field light generating element, the near-field light generating element having a near-field light generating part located in the medium facing surface, a surface plasmon being excited based on the light propagated through the waveguide, the surface plasmon being propagated to the near-field light generating part, the near-field light generating part generating near-field light based on the surface plasmon, wherein:

the near-field light generating element has an outer surface, the outer surface including: a bottom surface; first and second inclined surfaces that are each connected to the bottom surface, the first and second inclined surfaces decreasing in distance from each other with increasing distance from the bottom surface; an edge part that connects the first and second inclined surfaces to each other; and a front end face that is located in the medium facing surface and connects the bottom surface and the first and second inclined surfaces to each other, the front end face having: a first side that lies at an end of the first inclined surface; a second side that lies at an end of the second inclined surface; a third side that lies at an end of the bottom surface; and a tip that is formed by contact of the first and second sides with each other and forms the near-field light generating part, the method comprising the steps of forming the near-field light generating element;
forming the magnetic pole; and
forming the waveguide,
wherein the step of forming the near-field light generating element includes:
a step of forming a metal layer that is to be etched later to become the near-field light generating element;
a step of forming a polishing stopper layer on the metal layer, the polishing stopper layer being intended for use in a polishing step to be performed later;
a first etching step of etching the polishing stopper layer and the metal layer so that the metal layer is provided with the first inclined surface;
a step of forming a coating layer to cover the polishing stopper layer and the metal layer provided with the first inclined surface, the coating layer being made of a non-metallic inorganic material that has an etching rate lower than that of the metal layer in a second etching step to be performed later;
the polishing step of polishing the coating layer until the polishing stopper layer is exposed; and
the second etching step of etching the polishing stopper layer and the metal layer by using the coating layer polished in the polishing step as an etching mask so that the metal layer is provided with the second inclined surface and the edge part and thereby becomes the near-field light generating element.

4. The method of manufacturing the heat-assisted magnetic recording head according to claim 3, wherein the coating layer is made of one selected from the group consisting of $Al_2O_3$, $SiO_2$, $Ta_2O_5$, SiC, and TiN.

5. The method of manufacturing the heat-assisted magnetic recording head according to claim 3, wherein the step of forming the near-field light generating element further includes, between the polishing step and the second etching step, a step of forming a second polishing stopper layer on the coating layer, the second polishing stopper layer being intended for use in a second polishing step to be performed later, the method of manufacturing the heat-assisted magnetic recording head further comprising: a step of forming a second coating layer after the second etching step, the second coating layer being formed to cover the near-field light generating element, the coating layer and the second polishing stopper layer; the second polishing step of polishing the second coating layer until the second polishing stopper layer is exposed; and a step of removing the second polishing stopper layer after the second polishing step.

6. The method of manufacturing the heat-assisted magnetic recording head according to claim 3, wherein:

the step of forming the near-field light generating element further includes, before the step of forming the metal layer, a step of forming an accommodating layer that has an accommodating part in which the metal layer is to be accommodated later, the accommodating layer being made of a material that has an etching rate lower than that of the metal layer in the first and second etching steps to be performed later;

the metal layer is formed to be accommodated in the accommodating part in the step of forming the metal layer;

the polishing stopper layer is formed over the accommodating layer and the metal layer in the step of forming the polishing stopper layer; and the polishing stopper layer remains on the accommodating layer after the second etching step, the method of manufacturing the heat-assisted magnetic recording head further comprising: a step of forming a second coating layer after the second etching step, the second coating layer being formed to cover the accommodating layer, the polishing stopper layer, the near-field light generating element and the coating layer; a second polishing step of polishing the second coating layer until the polishing stopper layer is exposed; and a step of removing the polishing stopper layer after the second polishing step.

7. The method of manufacturing the heat-assisted magnetic recording head according to claim 3, wherein the magnetic pole has a bottom end that is opposed to the edge part of the near-field light generating element, and the step of forming the magnetic pole forms the magnetic pole after the step of forming the near-field light generating element.

8. The method of manufacturing the heat-assisted magnetic recording head according to claim 3, wherein the waveguide has a bottom surface that is opposed to the edge part of the near-field light generating element, and the step of forming the waveguide forms the waveguide after the step of forming the near-field light generating element.

* * * * *